US010183558B2

(12) United States Patent
Deckard et al.

(10) Patent No.: US 10,183,558 B2
(45) Date of Patent: Jan. 22, 2019

(54) UTILITY VEHICLE

(71) Applicant: Polaris Industries Inc., Medina, MN (US)

(72) Inventors: Aaron D. Deckard, Zionsville, IN (US); Brent A. Erspamer, Blaine, MN (US); Shawn D. Peterson, East Bethel, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 15/411,620

(22) Filed: Jan. 20, 2017

(65) Prior Publication Data
US 2017/0203639 A1    Jul. 20, 2017

Related U.S. Application Data

(60) Provisional application No. 62/280,976, filed on Jan. 20, 2016.

(51) Int. Cl.
| | |
|---|---|
| *B60J 5/04* | (2006.01) |
| *B60N 2/64* | (2006.01) |
| *B60N 2/24* | (2006.01) |
| *B60N 2/90* | (2018.01) |
| *B60R 21/02* | (2006.01) |

(52) U.S. Cl.
CPC ............ *B60J 5/0487* (2013.01); *B60J 5/0472* (2013.01); *B60N 2/24* (2013.01); *B60N 2/64* (2013.01); *B60N 2/986* (2018.02); *B60R 2021/028* (2013.01)

(58) Field of Classification Search
CPC ....... B60J 5/0487; B60J 5/0472; B60N 2/986; B60N 2/24; B60N 2/64; B60R 2021/028
See application file for complete search history.

(56) References Cited

U.S. PATENT DOCUMENTS

| | | | |
|---|---|---|---|
| 879,093 A | * | 2/1908 | Felton .................... B60J 5/0487 296/77.1 |
| 4,623,196 A | | 11/1986 | Roney |
| 8,302,711 B2 | | 11/2012 | Kinsman |
| 8,328,235 B2 | | 12/2012 | Schneider |
| 8,465,050 B1 | | 6/2013 | Spindler |
| 8,479,854 B1 | | 7/2013 | Gagnon |
| 8,613,335 B2 | | 12/2013 | Deckard |
| 8,973,693 B2 | | 3/2015 | Kinsman |

(Continued)

FOREIGN PATENT DOCUMENTS

| | | | | |
|---|---|---|---|---|
| DE | 19932256 | | 1/2001 | |
| DE | 202012006364 U1 | * | 10/2013 | .......... B66F 9/07545 |
| EP | 2684835 A1 | * | 1/2014 | ............. B60R 21/02 |

OTHER PUBLICATIONS

International Search Report and Written Opinion, issued by the International Searching Authority, dated May 4, 2017, for related International Patent Application No. PCT/US2017/014322.

(Continued)

*Primary Examiner* — Faye M Fleming
(74) *Attorney, Agent, or Firm* — Faegre Baker Daniels LLP

(57) ABSTRACT

A ROHVA compliant side restraint is disclosed which is movable between first and second positions wherein the first position the side restraint encompasses Point R, and in the second position the side restraint does not encompass Point R, increasing the accessibility for ingress and egress.

23 Claims, 36 Drawing Sheets

(56) References Cited

U.S. PATENT DOCUMENTS

| | | |
|---|---|---|
| 8,979,124 B2 | 3/2015 | Shinbori |
| 2002/0153718 A1 | 10/2002 | Schneider |
| 2015/0175114 A1 | 6/2015 | Schroeder |
| 2016/0325608 A1* | 11/2016 | Gagas .................... B60J 5/0472 |

OTHER PUBLICATIONS

American National Standard for Recreational Off-Highway Vehicles, approved by the American National Standard Institute, Inc. on Sep. 24, 2014; 64 pages.

* cited by examiner

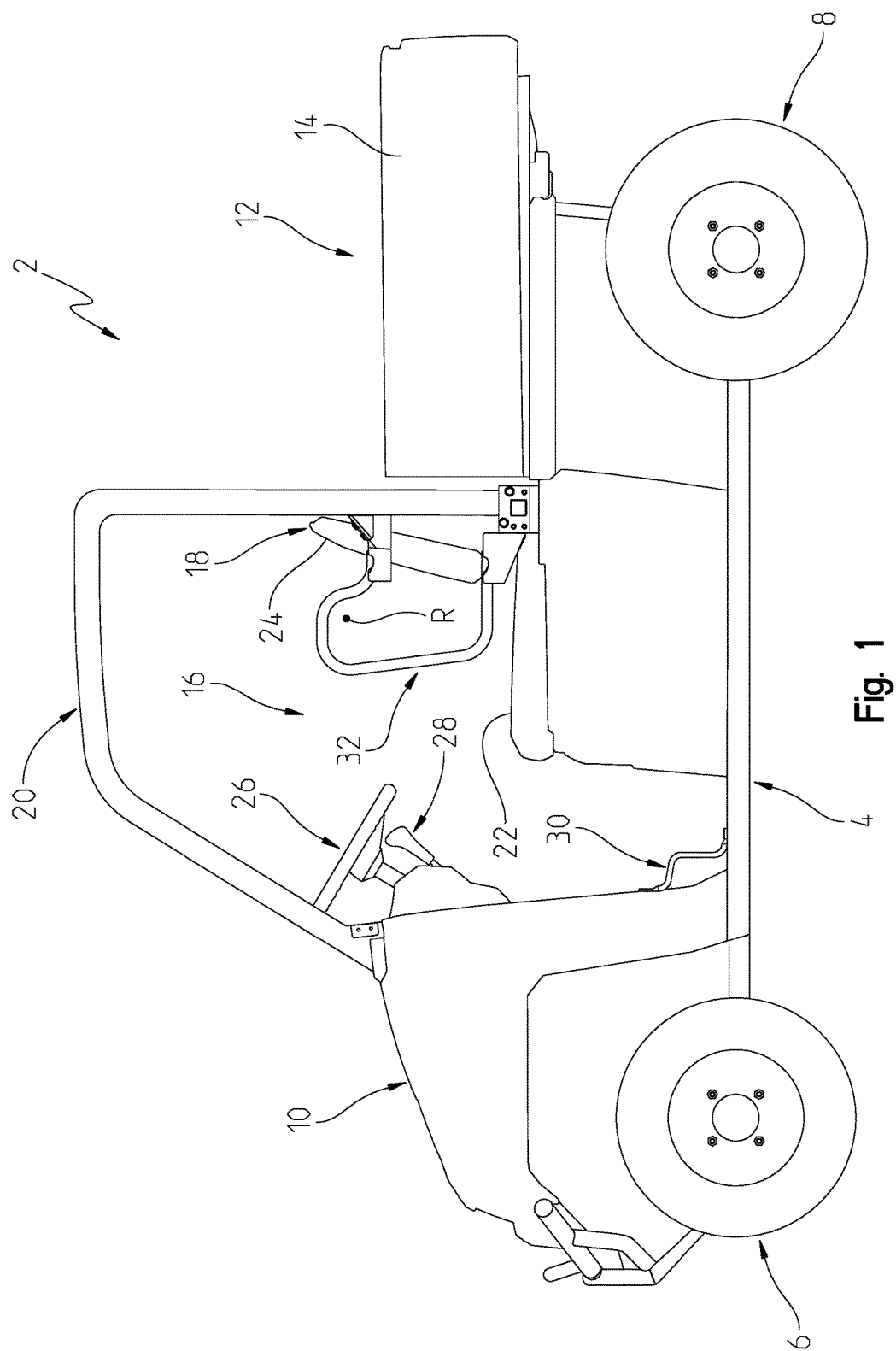

UTILITY VEHICLE

CROSS-REFERENCE TO RELATED APPLICATION

This application claims the benefit of U.S. Provisional Patent Application Ser. No. 62/280,976, filed Jan. 20, 2016, the entire disclosure of which is hereby expressly incorporated by reference.

BACKGROUND

The present disclosure relates to utility vehicles and in particular to a side by side vehicle having a driver and passenger side restraint.

Many types of utility vehicles are configured with side by side seats for recreational or utility use. Such examples include our U.S. Pat. Nos. 8,613,335; 8,973,693 and 8,302,711, the subject matter of which is incorporated herein by reference. The placement of any occupant restraints for such vehicles is governed by ANSI/ROHVA 1-2014, particularly Section 11. This section indicates that a point P should be provided for the foot, where a restraint is provided to block a shaded area defined forward of, and below a point P; where point P is no further than 229 mm (9 in.) forward of the seat base, and no less than 109 mm (4 in.) above the floor.

This section also indicates that a point R should be provided for the shoulder/hip, and that point R should be encompassed when viewed from the side of the vehicle. The measurements for the point R are taken with respect to the base of the seat back. The base of the seatback lies on the surface of the seat base along the centerline of the seating position and is measured without an occupant weight on the seat. Point R is located 432 mm (17 inches) along the seat back above the base of the seat back. Point R is also 152 mm (6 inches) forward of and perpendicular to the seatback surface.

SUMMARY

In a first embodiment, a utility vehicle comprising at least one seat having a seat bottom to support the weight of an occupant, and a seatback to support the occupant's back; the vehicle having a point R defined by the seatback wherein Point R is located 432 mm (17 inches) along the seat back above an intersection of the seat back and the seat bottom and 152 mm (6 inches) forward of and perpendicular to the seatback surface without an occupant's weight on the seat; and a side restraint adjacent to the seatback having a first position encompassing Point R when viewed from the side of the vehicle, and a second position to assist ingress and egress of the occupant when the vehicle is not moving.

In a second embodiment, a utility vehicle comprising at least one seat having a seat bottom to support the weight of an occupant, and a seatback to support the occupant's back; the vehicle having a point R defined by the seatback wherein Point R is located 432 mm (17 inches) along the seat back above an intersection of the seat back and the seat bottom and 152 mm (6 inches) forward of and perpendicular to the seatback surface without an occupant's weight on the seat; and a side restraint adjacent to the seatback being movable between first and second positions, where in the first position the side restraint encompasses Point R when viewed from the side of the vehicle, and in the second the side restraint moves to a position not encompassing Point R.

BRIEF DESCRIPTION OF THE DRAWINGS

The invention will now be described in relation to the drawing figures where:

FIG. 1 is a side view of a first embodiment of utility vehicle as disclosed in the present disclosure;

DETAILED DESCRIPTION OF THE EMBODIMENTS

Figure 1A:
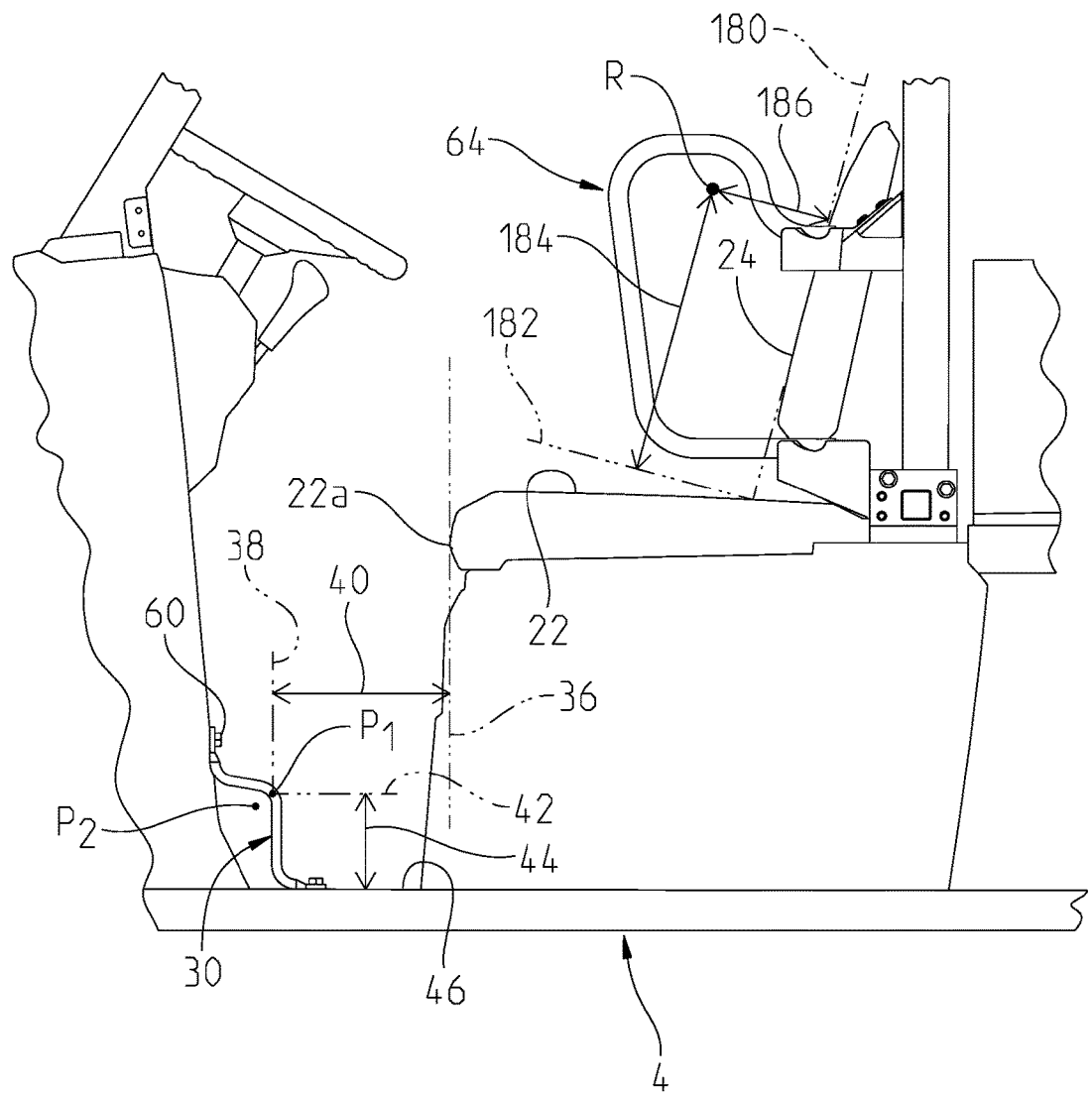
FIG. 1A shows an enlarged portion of FIG. 1.

With reference first to FIG. 1, a utility vehicle is shown at 2 comprising a frame 4 supported by front wheels 6 and rear wheels 8. Vehicle 2 includes a front body portion 10 and a rear body portion 12 including a utility bed defined at 14. An operator's compartment is defined at 16 including a seating area defined at 18. Operator's compartment 16 is enclosed by a cab frame 20. Seating area 18 could be defined by two bucket seats or a bench style seat having seating positions for two-three persons. As shown, a bench-type seating area is defined by a seat bottom 22 and a seat back 24. Operator's compartment 16 further includes operator controls such as a steering wheel 26 and a gear shift lever 28. Finally, operator's area further includes a foot restraint at 30 and a side restraint at 32.

With reference now to FIG. 1A, a reference line 36 is shown at a front end 22A of seat bottom 22. A second reference line 38 is shown at a distance 40 forward of reference line 36, where distance 40 is a maximum of 229 mm (9 in.). A third reference line 42 is defined at a vertical distance 44 from a top of floor 46, where distance 44 is a minimum of 102 mm (4 in.). When distance 40 equals 229 mm and when distance 44 equals 102 mm, point $P_1$ is defined (as per ROHVA 1-2014) at a corner of foot restraint 30. It should be realized that distance 40 could be less than 229 mm and that distance 44 could be greater than 102 mm which would show foot restraint 30 encompassing point P which is shown in FIG. 1A at $P_2$.

Figure 2:
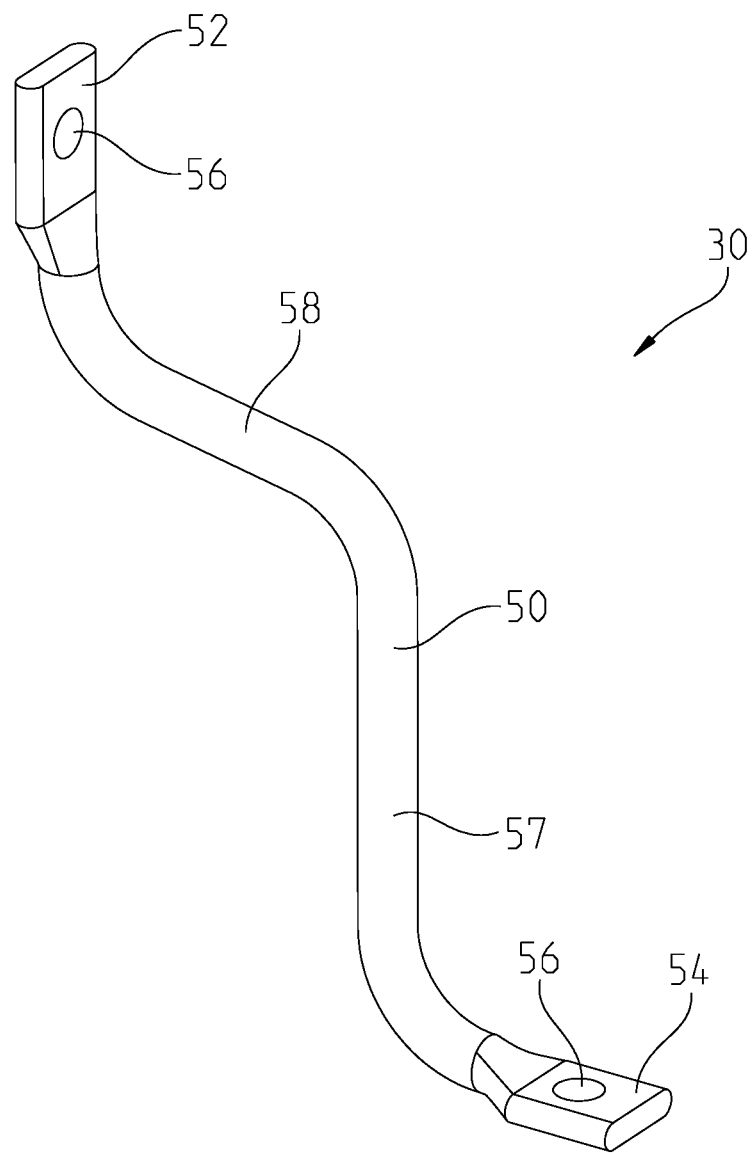
FIG. 2 shows a left rear perspective view of the foot restraint shown in FIG. 1.

With reference now to FIG. 2, foot restraint 30 is shown as a solid bar 50 where each end is flattened to define a first and upper mounting bracket 52 and a second and lower mounting bracket at 54. Each bracket has an aperture at 56 for mounting of the restraint to the vehicle frame 4. Bar 50 is defined with a vertical portion 57 and a horizontal portion at 58. Foot restraint 30 may be fastened to the frame by way of fasteners 60 (FIG. 1A) such as bolts. As opposed to a metal foot restraint, the foot restraint may be plastic, and may be trapezoidal in configuration to fit against the rear edge of the front body panel and against the floor board.

Figure 3:
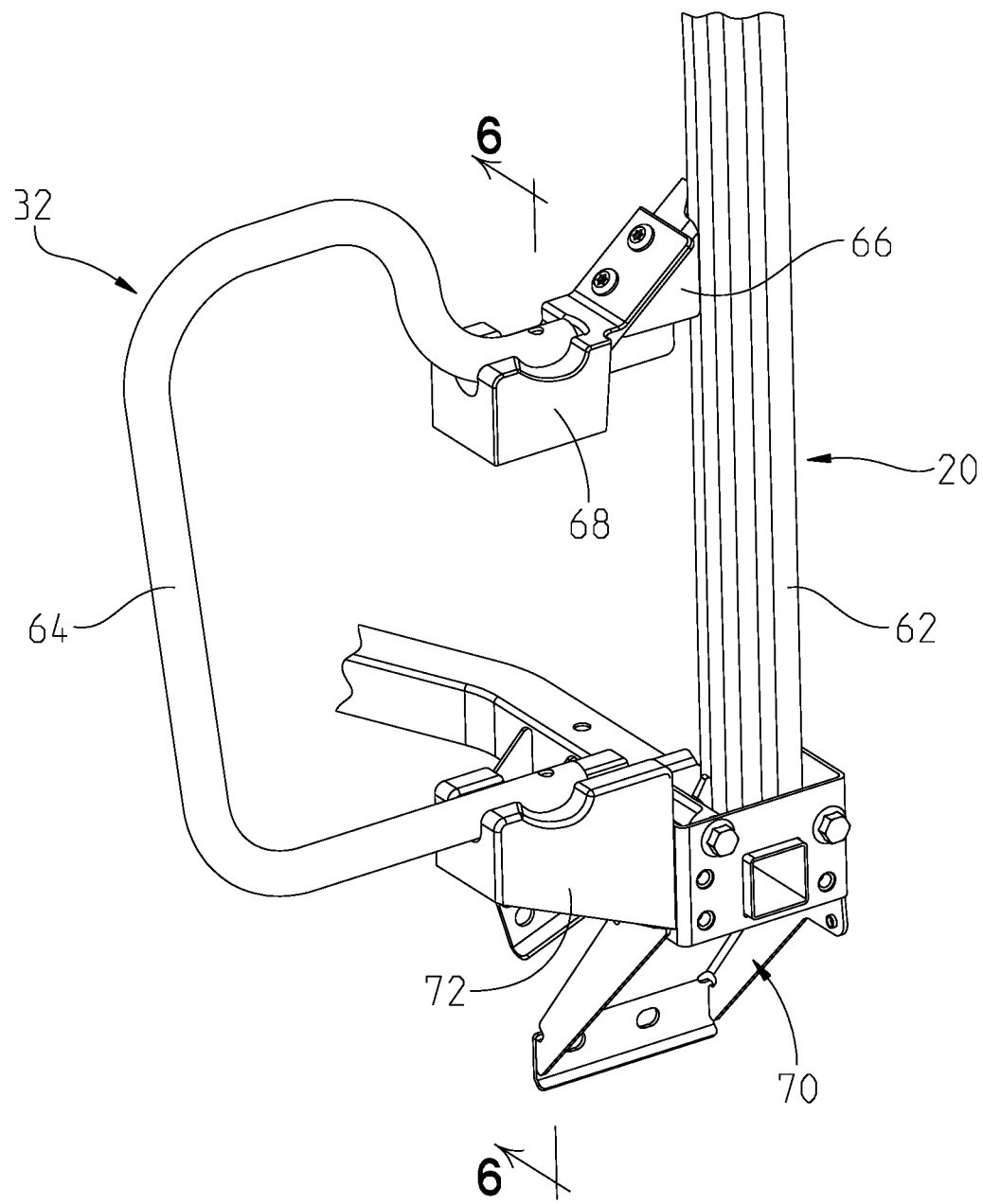
FIG. 3 is a left front perspective view of the side restraint shown in FIG. 1.
Figure 4:
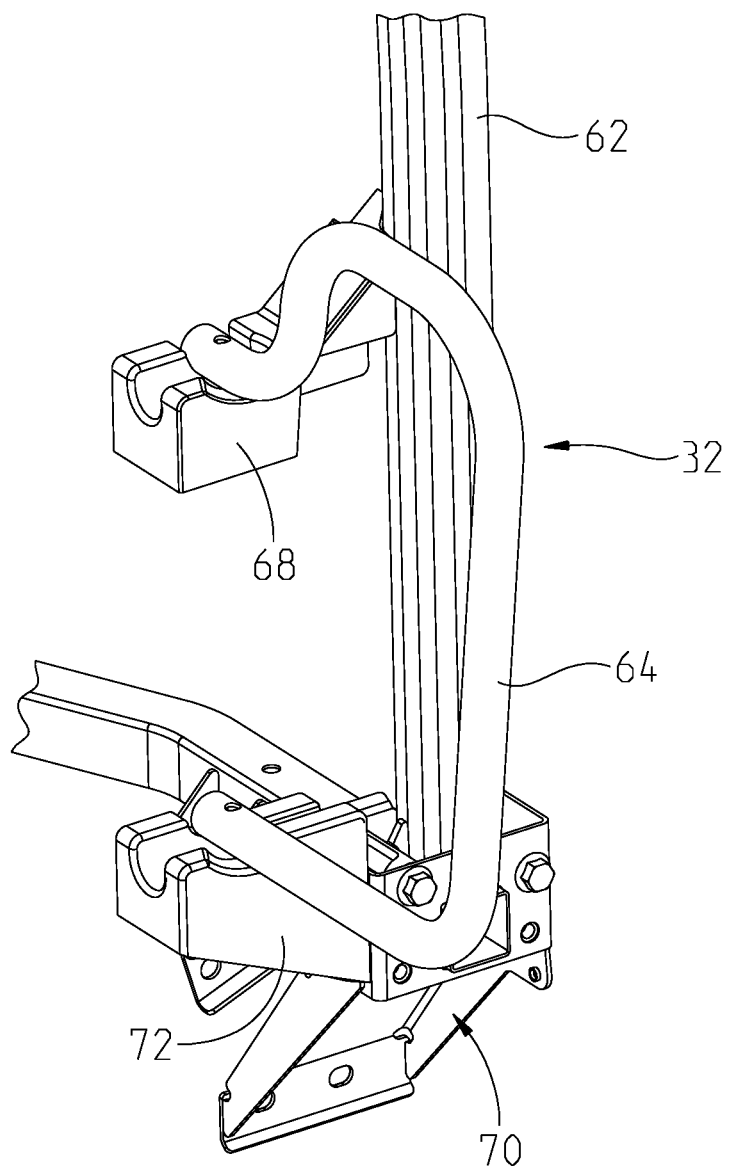
FIG. 4 is a front left perspective view similar to that of FIG. 3, showing the side restraint in an open position.
Figure 5:
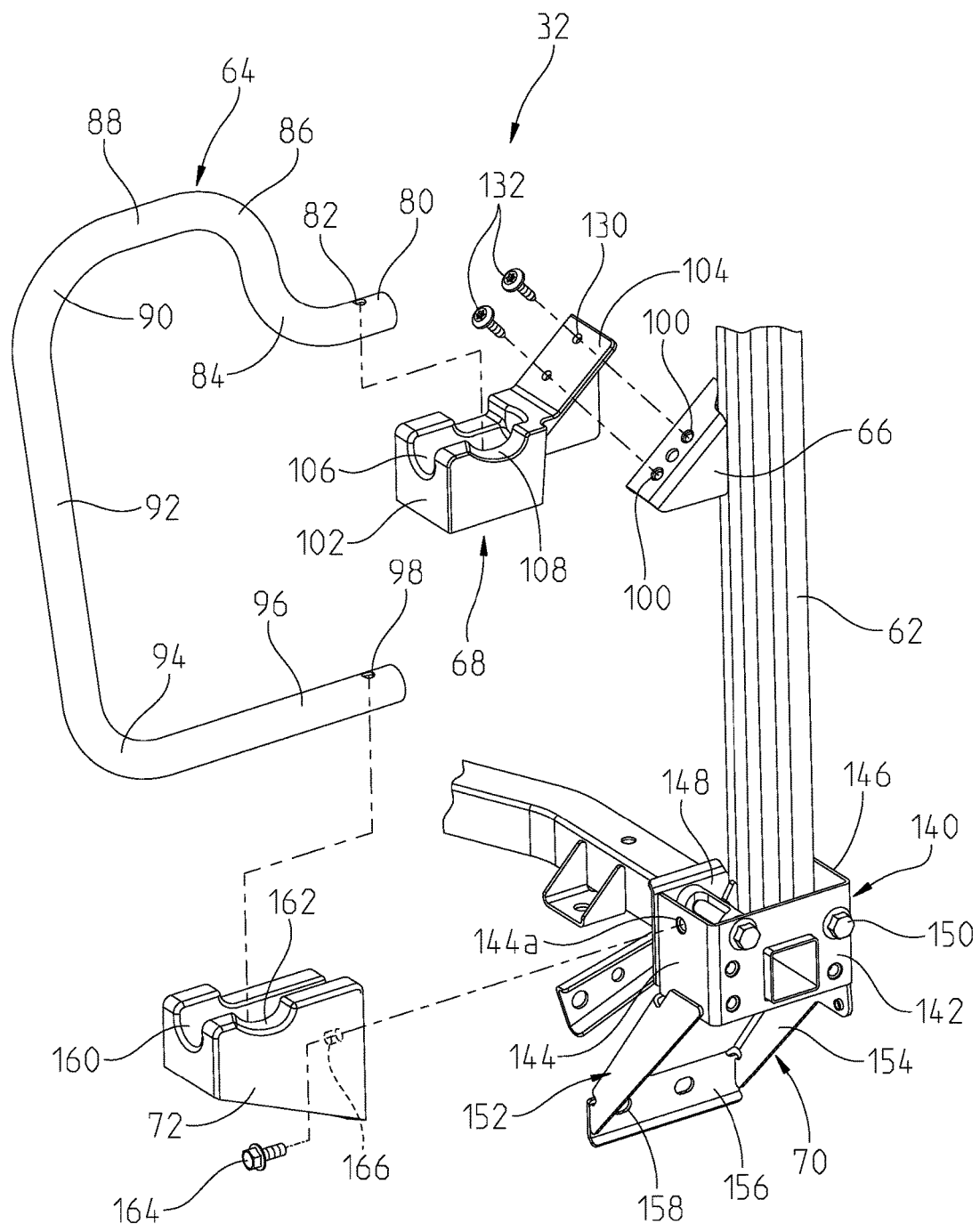
FIG. 5 is an exploded view of the side restraint shown in FIG. 3.

With reference now to FIG. 3, side restraint 32 is shown as coupled to rear post 62 of cab frame 20. Side restraint 32 includes a restraint bar 64, upper bracket 66, upper detent 68, lower bracket 70, and lower detent 72. It should be appreciated that bar 64 may be moveable between a first position shown in FIG. 3 and into a second and open position shown in FIG. 4. With reference now to FIG. 5, the details of side restraint 32 will be described in greater detail.

Side restraint 32 includes a moveable restraint bar 64 having an upper mounting leg 80 having an aperture at 82, which transitions into first and second radiused portions 84, 86, to provide an upper horizontal portion at 88. Portion 88 transitions into radiused portion 90 which then provides a vertical portion 92 which transitions into radiused portion 94. Radiused portion 94 transitions into lower horizontal section 96 having an aperture at 98.

Upper bracket 66 is mounted to post 62 by known mechanical means such as by fasteners and or welding. Bracket 66 includes two threaded apertures at 100 for mounting detent 68 as described herein.

Figure 6:
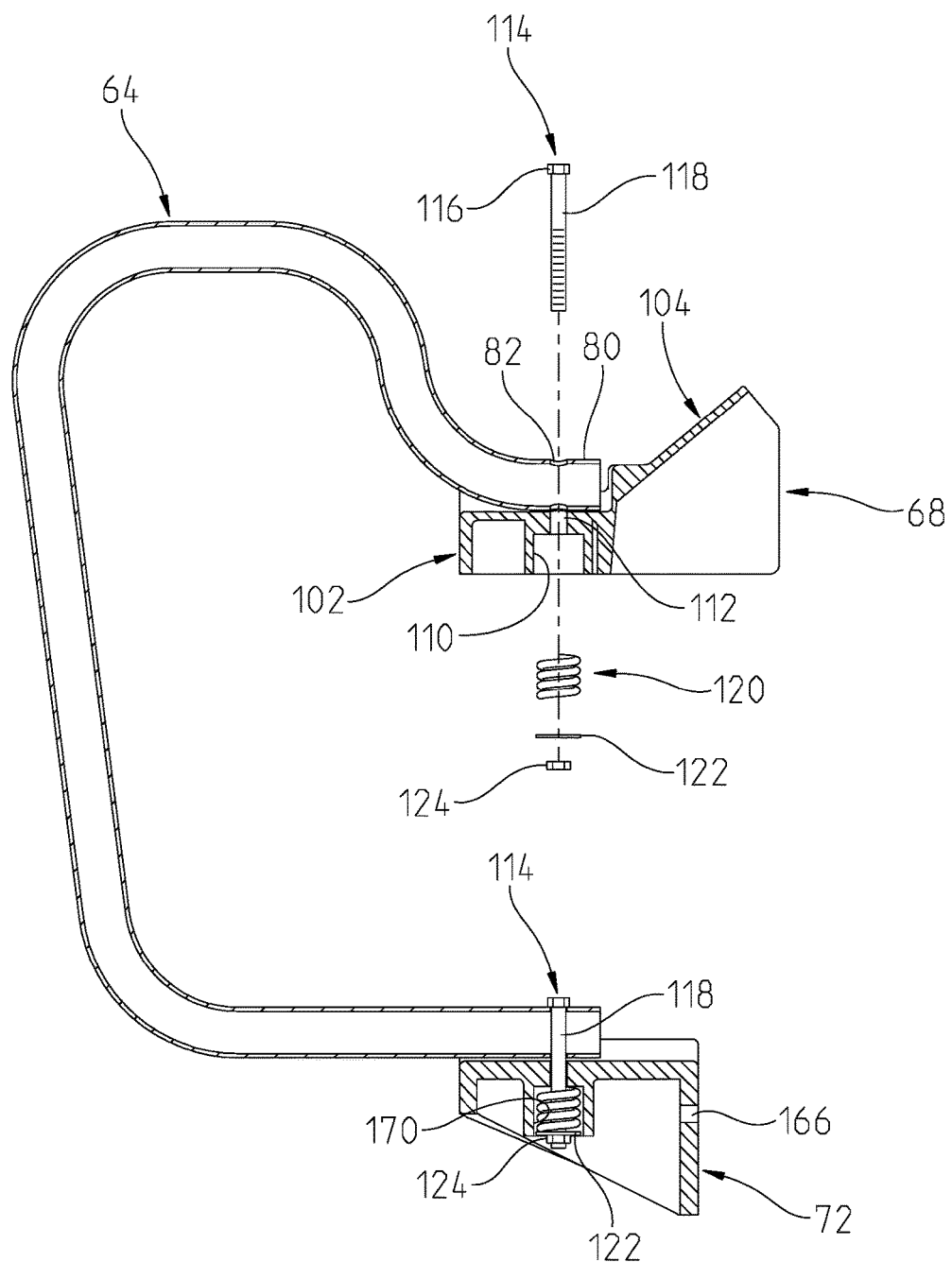
FIG. 6 is a cross sectional view taken through lines 6-6 of FIG. 3.

Detent 68 includes a detent section 102 and a mounting bracket 104. Detent section 102 includes a first semi-cylindrical detent portion 106 and a transverse detent portion 108. It should be appreciated that detent portion 106 is profiled to receive leg 80 of restraint bar 64 as shown in either of FIG. 3 or 6. With reference to FIG. 6, detent portion 102 includes a counterbore at 110 which is coaxially aligned with an aperture 112 which aligns with aperture 82 of leg 80. A fastener 114 is provided having a head 116 and a threaded shank 118, where shank is receivable through apertures 82 and 112 to position the threaded portion into counterbore 110. A compression spring 120 and washer 122 are receivable over the end of shank 118 and a fastener 124 such as a nut may be threaded onto threaded shank 118. Thus, compression spring 120 spring loads the restraint bar 64 in the downward position as shown in FIG. 6.

Mounting portion 104 of detent portion 68 includes two apertures 130 to receive fasteners 132 to couple detent 68 to bracket 66, where fasteners 132 are received in threaded apertures 100.

Bracket 70 includes a box-shaped bracket portion 140 having a outer side wall 142, front and rear walls 144 and 146, and an inner wall at 148, where the box-shaped section may be coupled to post 62 by way of fasteners 150. Bracket 70 further includes a depending bracket portion 152 having legs 154 and a lower mount portion 156 having apertures 158 for coupling to a portion of frame 4.

Lower detent 72 includes a first detent portion 160 and a second detent portion 162. Detent 72 is mountable to front side wall 144 by way of a fastener 164 extending through aperture 166 and threadably engaged in threaded aperture 144A. As shown best in FIG. 6, detent 72 also includes a counterbore at 170 which receives the fastener 114 compression spring 120, washer 122 and fastener 124 as described above. Thus, in the assembled position as shown in FIG. 6, each of the fasteners 124 are partially threaded onto threaded shank 118 so as to compress spring 120 but ample room exists between a top of counterbore 110 and 170 and washers 122 such that the restraint bar 64 may be lifted (under spring load from spring 120) to a position where legs 80 and 96 clear their corresponding detent portions 106, 160. At that position, the restraint bar 64 may be turned outwardly to the position of FIG. 4 whereby release of the restraint bar spring loads the restraint bar downwardly to the position where the restraint bar now resides in detent portions 108, 162.

With reference again to FIG. 1A, an axis 180 is shown along the base of seat back 24 extending to the seat bottom 22. Another axis 182 is shown extending from axis 180 in a perpendicular sense, and extending from the seat bottom 22. Therefore, a point R is defined at a distance 184 measured from axis 182 and a distance 186 measured form axis 180. As mentioned above, and according to ANSI/ROHVA 1-2014, position R should be located where distance 184 is at least 432 mm (17 in.) and wherein distance 186 is at least 152 mm (6 in.) forward from axis 180. This positions point R in the upper loop portion as defined by restraint bar portions 84-92 (FIG. 5). Thus, when the vehicle is in an operable mode, the restraint bar is positioned in the configuration of FIG. 3 whereby the point R is encompassed by the restraint bar 64 and when the vehicle is stopped, the restraint bar may be moved to the position of FIG. 4 allowing a larger opening for ingress and egress. It should also be appreciated that the restraint bar could be equipped with a sensor system such as that described in our U.S. Pat. No. 8,534,397 to provide an auditory signal or a reduced throttle opening, if the restraint bar were in the position of FIG. 4 and the vehicle were attempted to be operated.

Figure 7:
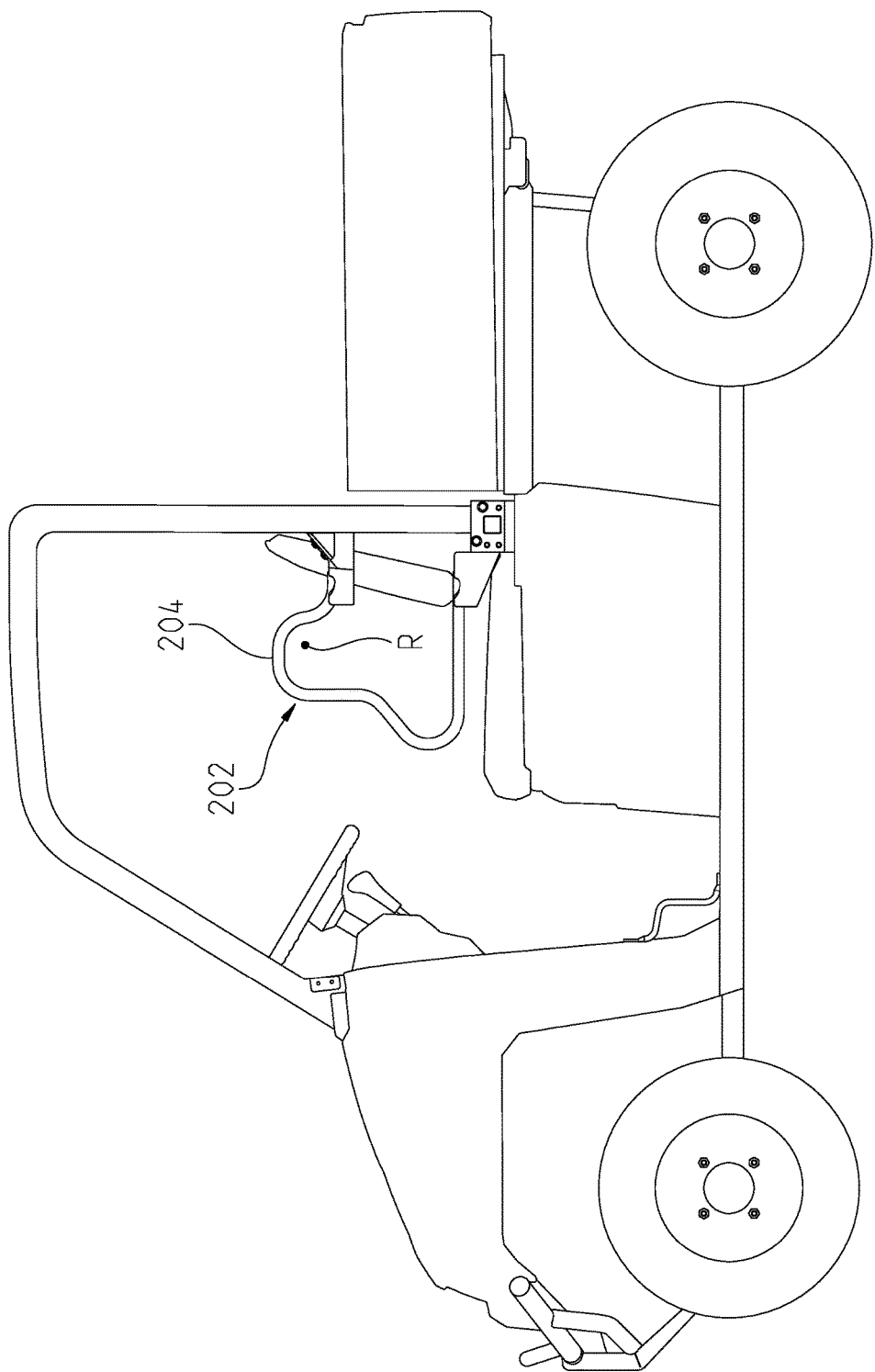
FIG. 7 is a side view of a second embodiment of utility vehicle as disclosed in the present disclosure.
Figure 8:
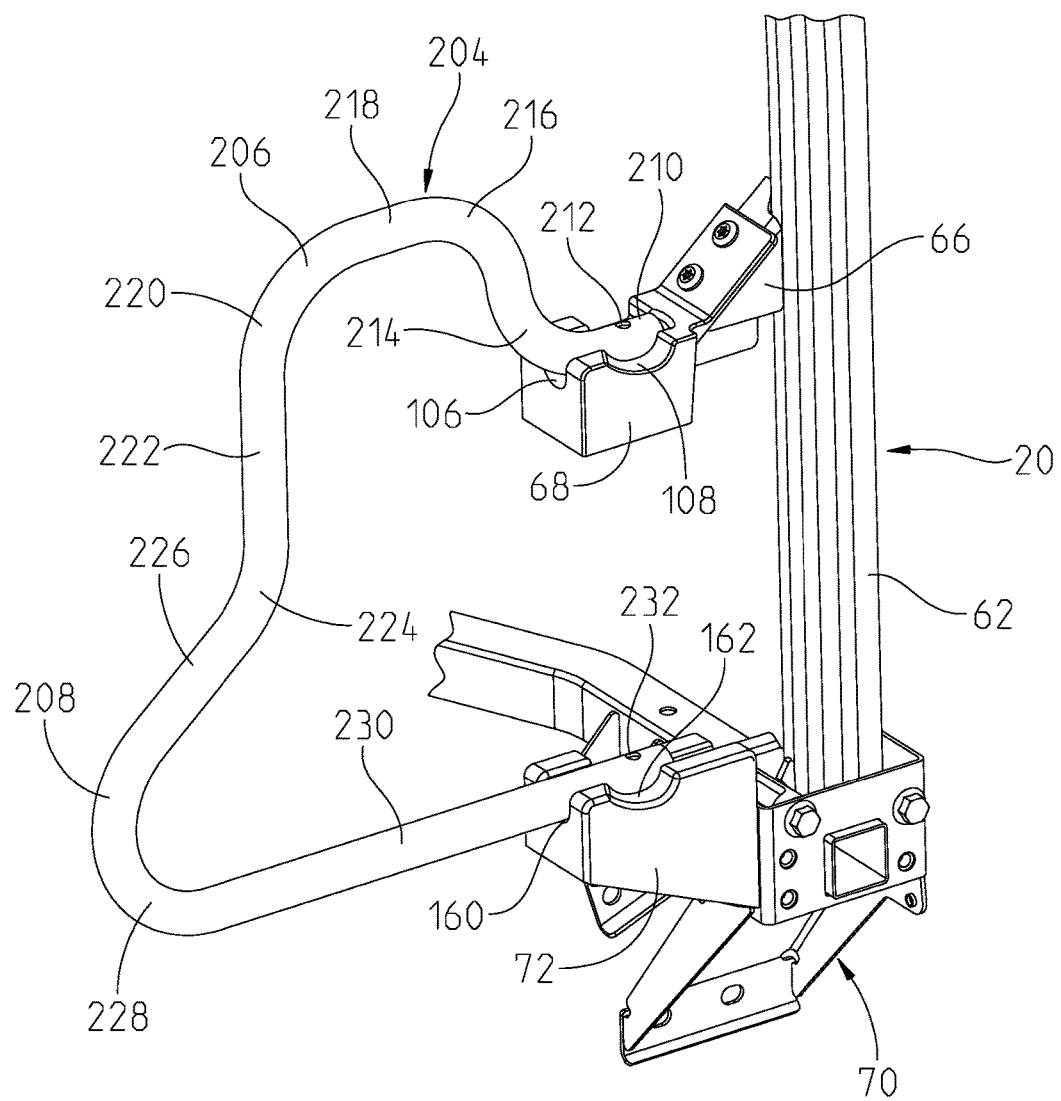
FIG. 8 is a left front perspective view of the side restraint shown in FIG. 7.

With reference now to FIGS. 7 and 8, a second embodiment of the side restraint will be shown at 202 where all of the components with the exception of the restraint bar 204 are identical to that described above with respect to restraint bar 32 and therefore will not be described again in detail.

In the embodiment shown in FIGS. 7 and 8, restraint bar 204 is configured to have an upper shoulder restraint portion 206 and an extending portion at 208 which is forward of and lower than shoulder restraint portion 206 for restraining the operator's thigh. Thus, restraint bar 204 is defined by an upper leg 210 positioned in detent 106 having an aperture at 212, where leg 210 transitions into radiused portions 214 and 216. A horizontal section 218 extends forwardly transitioning into radiused portion 210 which extends downwardly to transition into a vertical portion at 222. At this position, the restraint transitions forward by way of radiused portion 224 into a straight section 226 and then transitioning into radiused section 228. A second and lower leg 230 extends rearwardly and has an aperture at 232. Leg 230 is positioned in detent section 160. Restraint bar 204 may be raised upwardly under the influence of compression springs 120 whereby the horizontal portions 210 and 230 may be rotated into the detent sections 108 and 162 in a similar manner as described above with reference to restraint bar 64.

Figure 9:
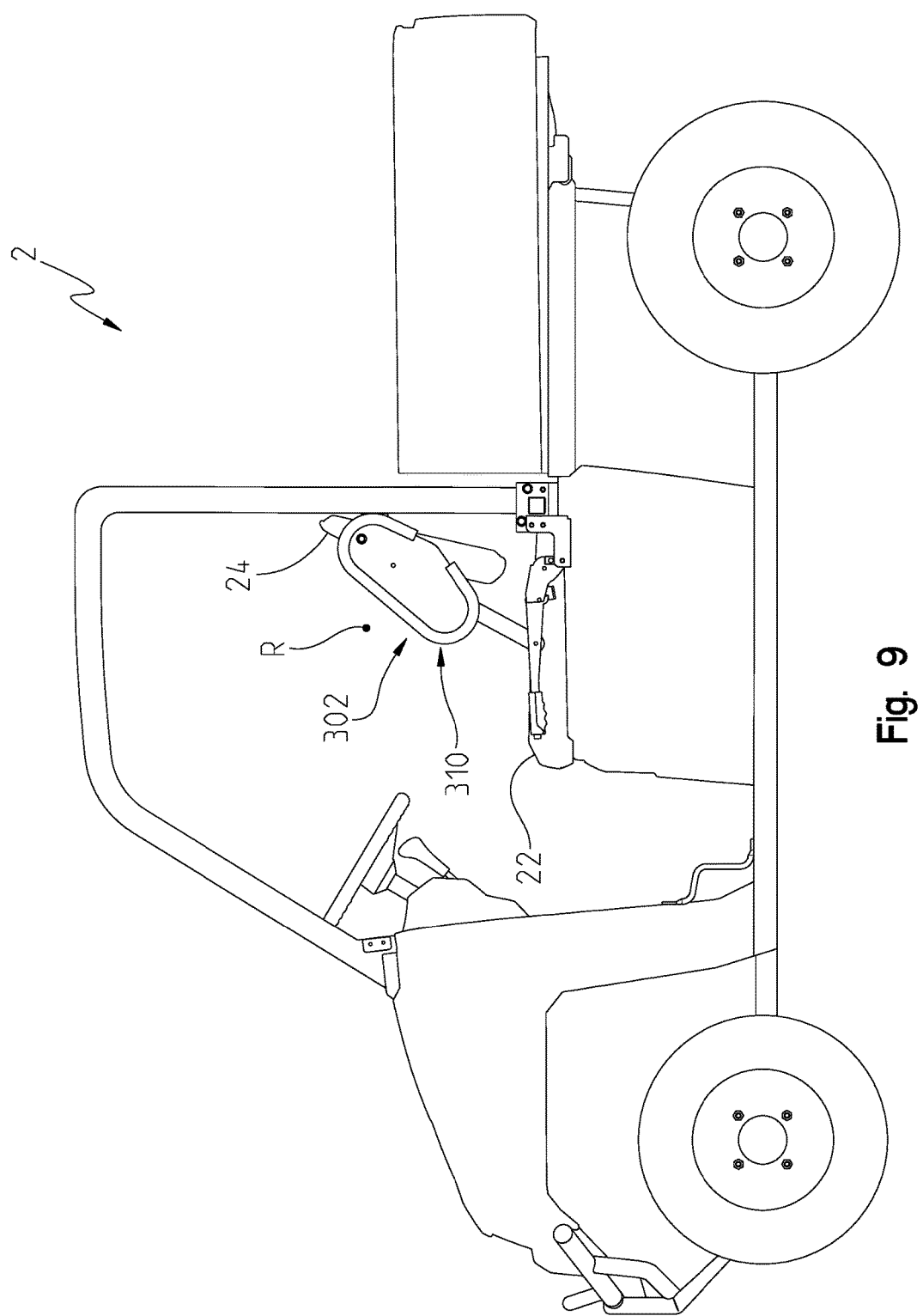
FIG. 9 is a side view of a third embodiment of utility vehicle as disclosed in the present disclosure.
Figure 10:
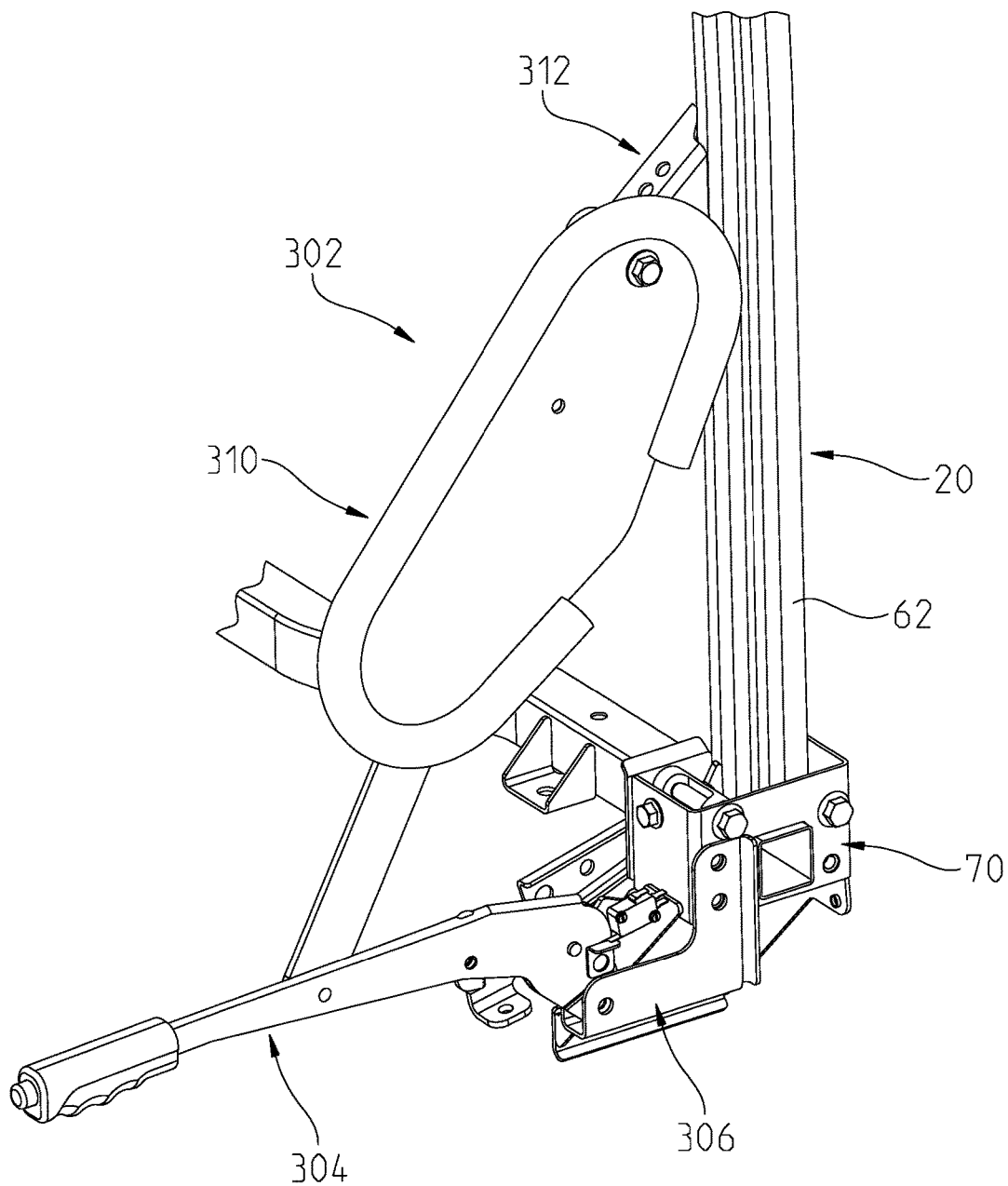
FIG. 10 is a left front perspective view of the side restraint shown in FIG. 9.
Figure 11:
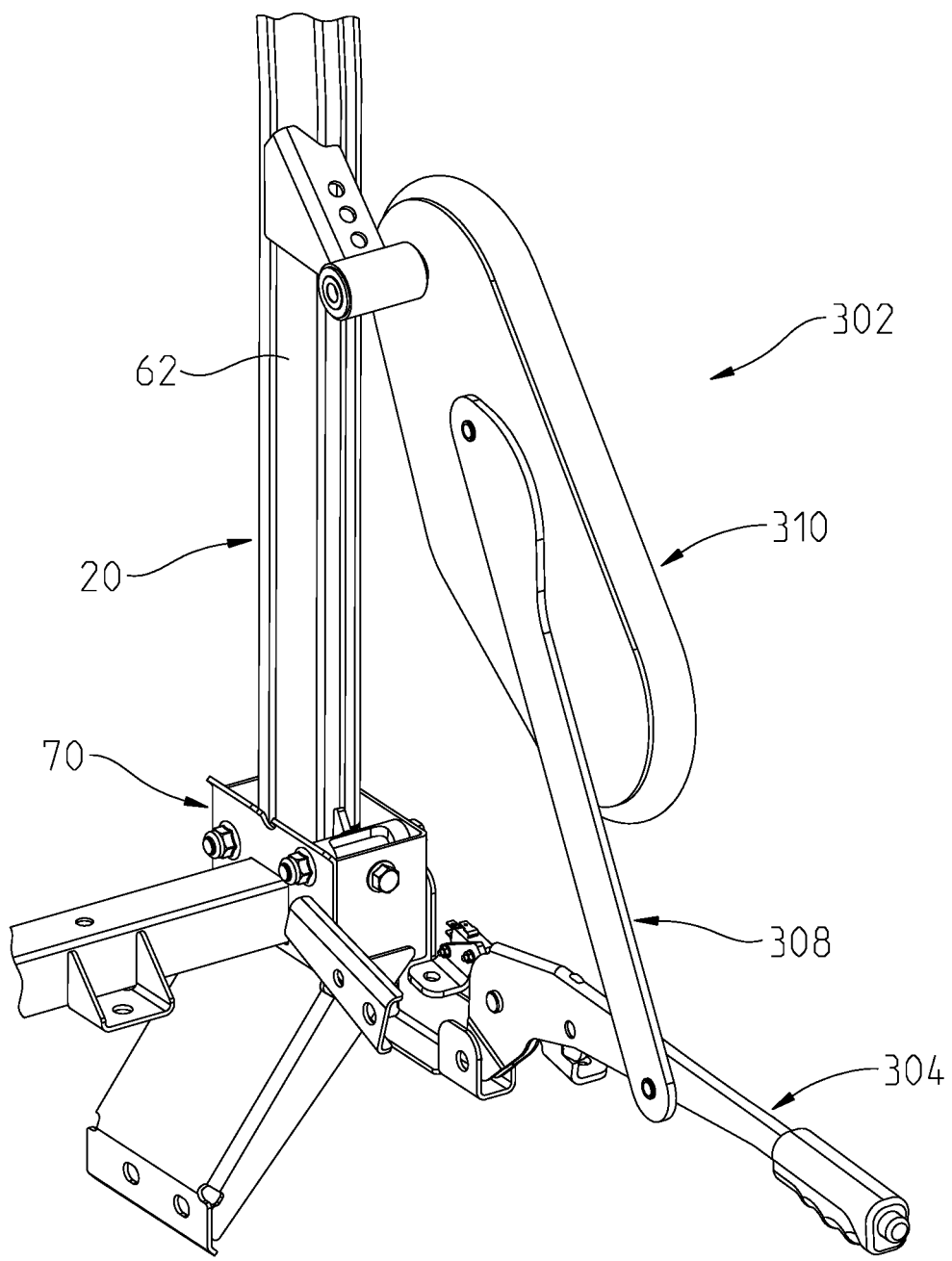
FIG. 11 is a right front perspective view of the side restraint shown in FIG. 9.
Figure 12:
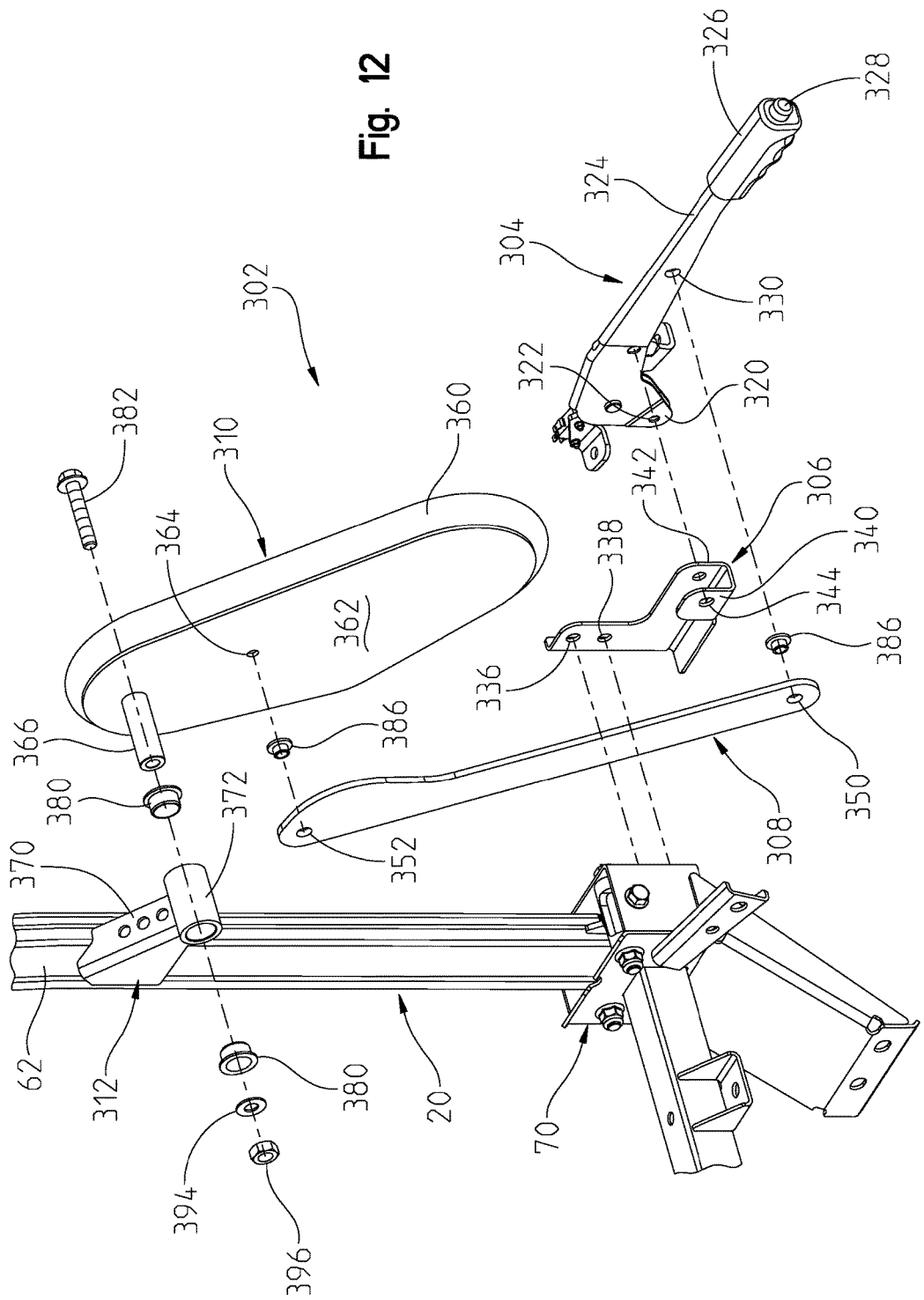
FIG. 12 is an exploded view of the side restraint shown in FIG. 11.
Figure 13:
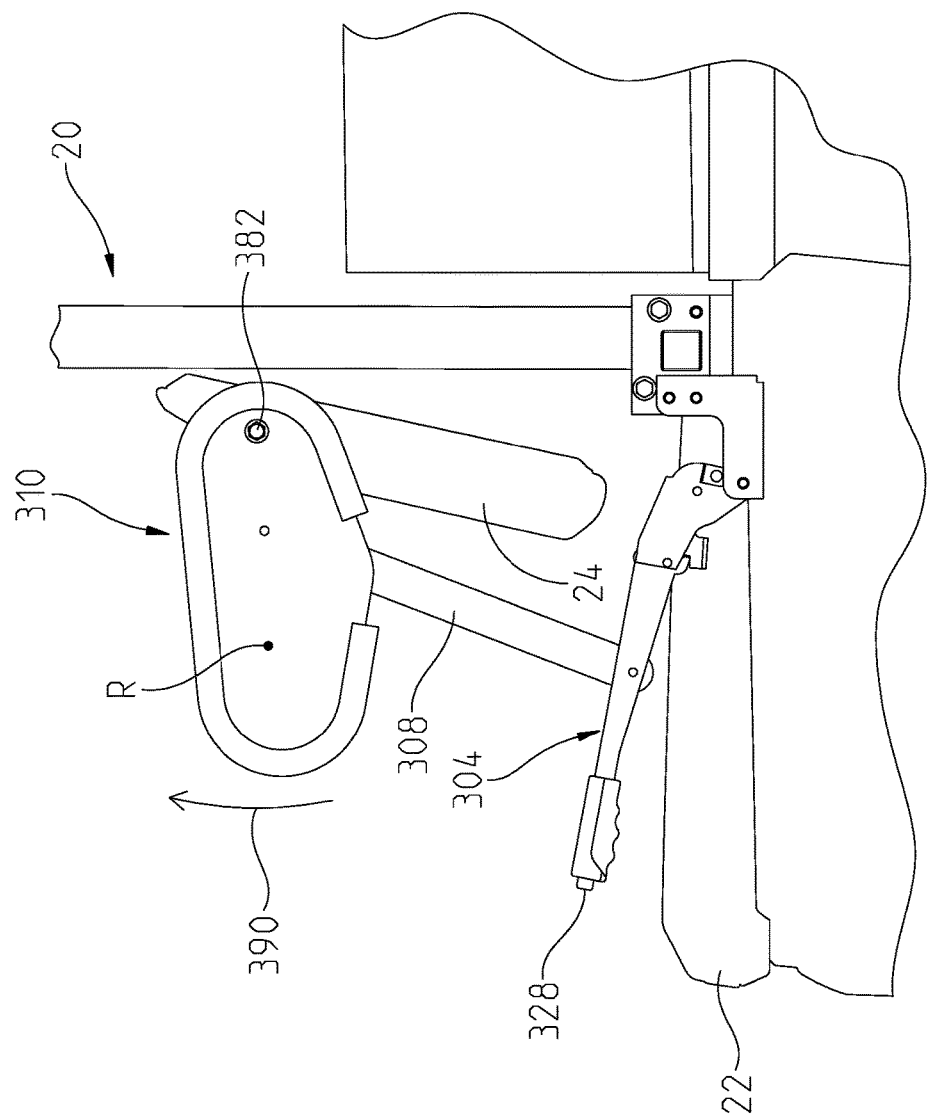
FIG. 13 shows the side restraint of FIG. 10 in an upright position.

With reference now to FIGS. 9-13, a third embodiment of side restraint will be described. With reference first to FIG. 9, a third restraint is shown as 302 which is shown in the down position, that is the position where the vehicle is not moving. It should be appreciated that in this embodiment the side restraint moves upwardly to a position as shown in FIG. 13. With reference now to FIGS. 10-12, the side restraint 302 will be described in greater detail. In this design, the side restraint 302 generally comprises a retaining mechanism in the form of a lever arm 304 coupled to bracket 70 by way of a secondary bracket 306. Lever arm 304 is coupled to a link arm 308 (FIG. 11) which in turn couples to moveable restraint 310 with moveable restraint 310 being coupled to rear post 62 by way of bracket 312.

With reference to FIG. 12, lever arm 304 includes a pivot mount 320 having apertures 322 about which an arm 324 may pivot. Lever arm 304 is similar to an automotive emergency brake type handle having a handle grip 326 and a release button 328. A pad could be added over the top of lever arm for an arm rest. It should be appreciated that pulling the handle upwardly causes an internal ratchet and pawl system to lock whereas depressing button 328 releases the pawl from the ratchet, allowing the lever arm to be rotated downwardly. Lever 324 includes an aperture at 330 for coupling to link arm 308. Bracket 306 is L-shaped having an upper portion at 336 with apertures 338 for mounting to bracket 70. A lower portion of bracket 306 includes wall portions 340 and 342 having apertures at 344. Link arm 308 has a lower aperture at 350 and an upper aperture at 352.

Moveable restraint 310 includes an outer tubular portion 360 and an inner sheet 362 where sheet 362 includes an aperture at 364 and an axle 366. Bracket 312 includes a portion 370 fixed to post 62 such as by fasteners or welding and includes a coupling at 372 profiled to receive axle 366.

Thus, in this design, lever arm 304 is coupled to bracket 306 by aligning apertures 322, 344 whereupon a fastener (not shown) is positioned through both apertures allowing lever 324 to move relative to bracket 306. Moveable restraint 310 is coupled to bracket 312 where sleeves 380 are received in coupling 372, and axle 366 is positioned through sleeves 380. A fastener 382 couples moveable restraint 310 to bracket 312 by way of fasteners 394, 396. Meanwhile, link arm 308 is coupled to both moveable restraint 310 by positioning sleeves 386 in apertures 350, 352, whereupon a fastener (not shown) can be received through sets of apertures 352, 364; and 330, 350.

Thus, in this design, moveable restraint 310 may be moved from the position shown in FIG. 9, allowing ingress and egress to the vehicle, to the position shown in FIG. 13. In the FIG. 13 position, lever arm 304 is raised, causing moveable restraint 310 to move upwardly in the direction of arrow 390 to a position where restraint 310 encompasses point P.

Figure 14:
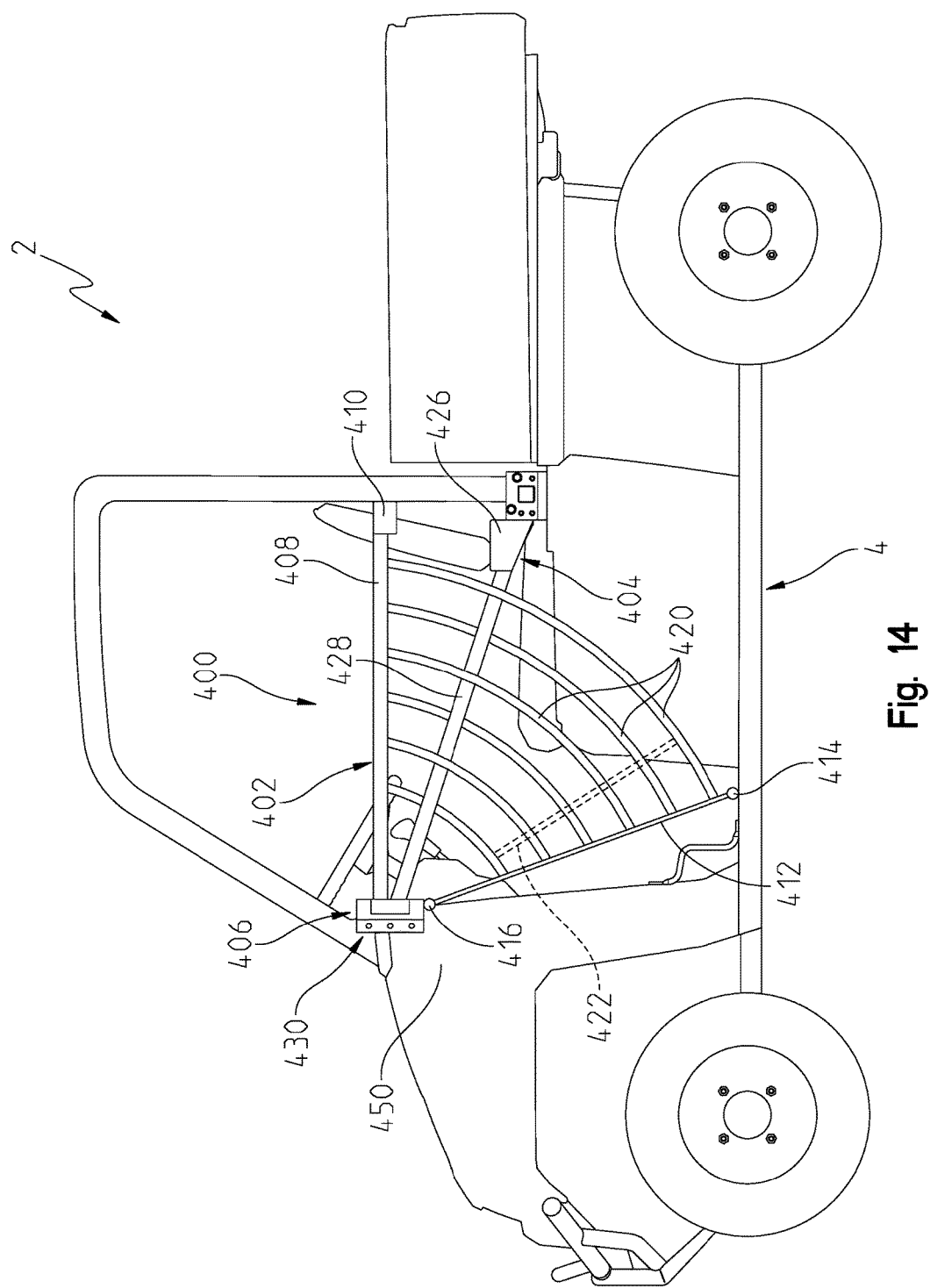
FIG. 14 is a side view of a fourth embodiment of utility vehicle as disclosed in the present disclosure.

With reference now to FIG. 14, vehicle 2 has a side net assembly 400, where the side net assembly generally comprises a net portion 402, a retractor 404 and a locking member 406. Net 402 includes a top strap 408 coupled to the vehicle by way of a bracket 410 and coupled to the locking member 406 at the front end. At a front edge of the net assembly 402, a rod 412 is provided which pivots to the vehicle at point 414. While the pivot could be a ball socket allowing multiple degrees of freedom, the pivot is preferably a pin socket allowing rotation only forward and rearward to provide some stiffness to the net 402. The rod is fixed at point 416, however another pin socket could be provided at 416 allowing the rod 412 to be rotatably coupled to the locking member 406.

With reference still to FIG. 14, the net portion 402 includes connecting strap portions 420 coupled to the top strap 408 and to the rod 412. It should be appreciated that other strap portions 422 could be provided along multiple transverse positions to the strap portions 420. It should also be appreciated that the configuration of the net itself can modified in almost any manner and still operate with the embodiment shown. For example the net could be a more rectangular configuration having generally horizontal and vertical straps.

Figure 15:
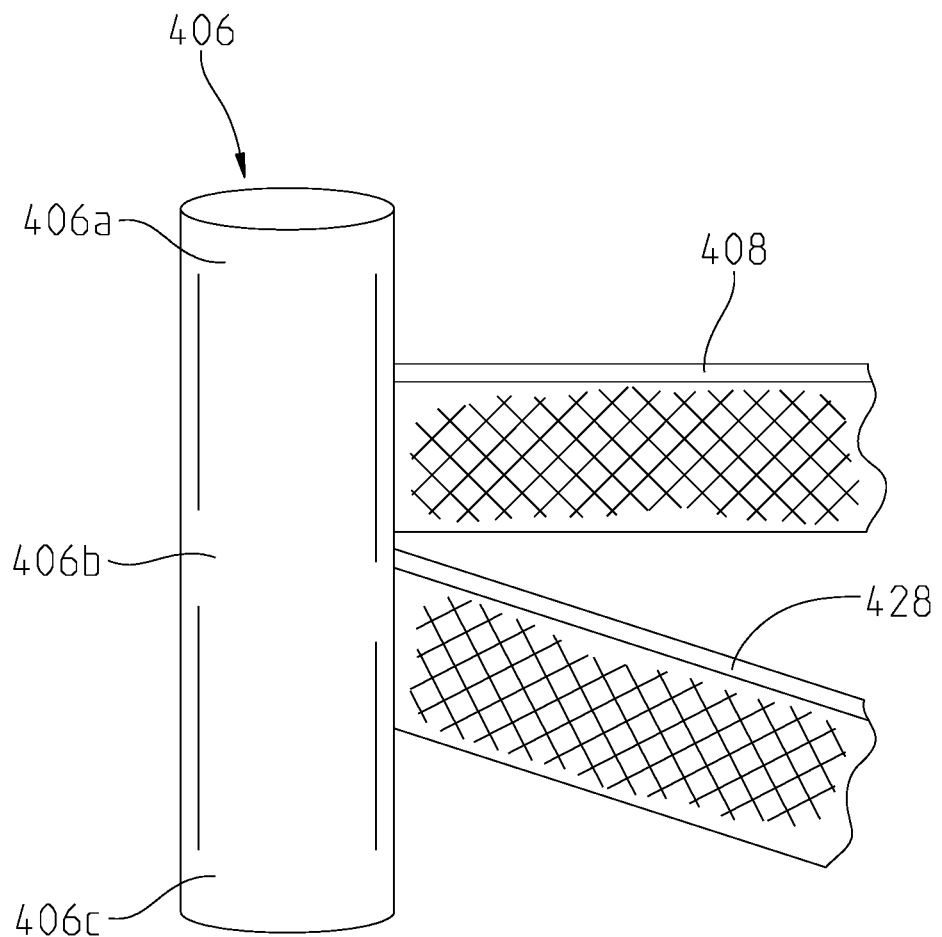
FIG. 15 is an enlarged view of the locking member shown in FIG. 14.

With reference still to FIG. 14, the retractor 404 includes a retractor body 426 and a retracted belt 428. The retractor is similar to a seat belt retractor where the belt is spring loaded towards the retractor body 426. A leading end of the belt 428 is also coupled to the locking member 406. Locking member is best shown in FIG. 15 as having a cylindrical configuration with upper 406a, middle 406b and lower 406c portions, where the top strap 408 and retractor strap 428 are coupled to the middle cylindrical portion 406b.

Figure 16:
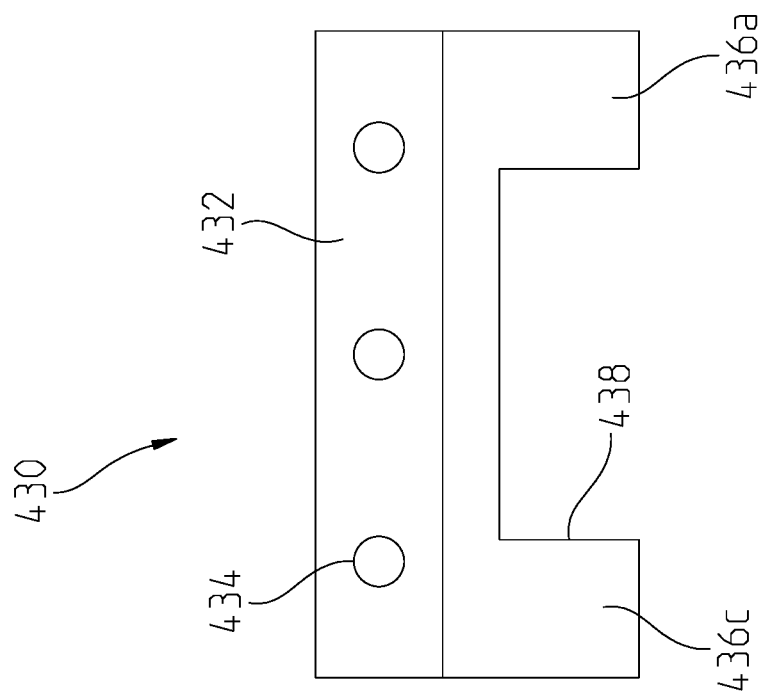
FIG. 16 is a side view of the locking bracket which cooperates with the locking member.

The locking member 406 is coupled to the vehicle frame 4, by way of a counterpart locking bracket 430. Bracket 430 is coupled to the vehicle frame 4 and also couples the locking member 406 to the bracket 430. Locking bracket 430 could be similar to that shown in FIGS. 16 and 17, where bracket 430 includes a flange 432 having apertures 434 for mounting to the vehicle frame. A hook portion 436 extends from the flange 432 and includes a notch at 438. Notch 438 defines an upper hook portion 436a and a lower notch portion 436c.

Figure 17:
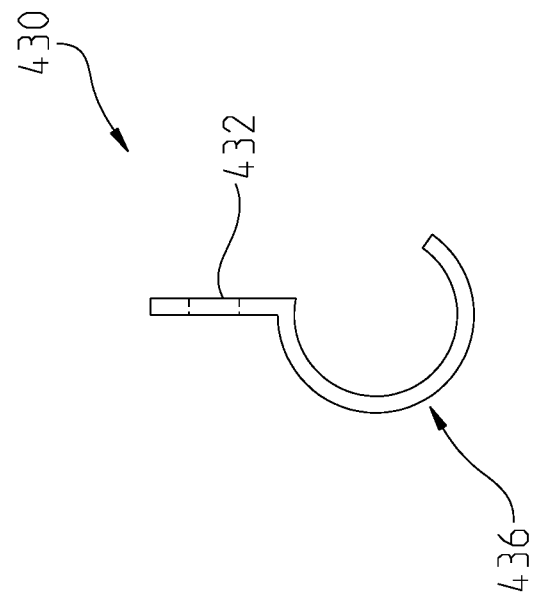
FIG. 17 is an end view of the locking bracket of FIG. 16.

Thus when bracket 430 is coupled to the vehicle frame, locking member 406 may be coupled within the arcuate hook portion 436, as best shown in FIG. 17. In this position, the retractor belt 428 and the top strap 408 would be received in the notch 438, and the cylindrical portions 406a and 406c would be coupled within their corresponding hook portions 436a and 436c, respectively.

When the net assembly needs to opened for ingress or egress, the locking member 406 is removed from the bracket 430, and the tension on the retractor belt 428 pulls the locking member (and the accompanying net) to the retractor body 426. It should be understood that the retractor strap is not connected to the net along its length; rather the net straps 420, 422 are simply braided around the retractor strap 428.

Figure 18:
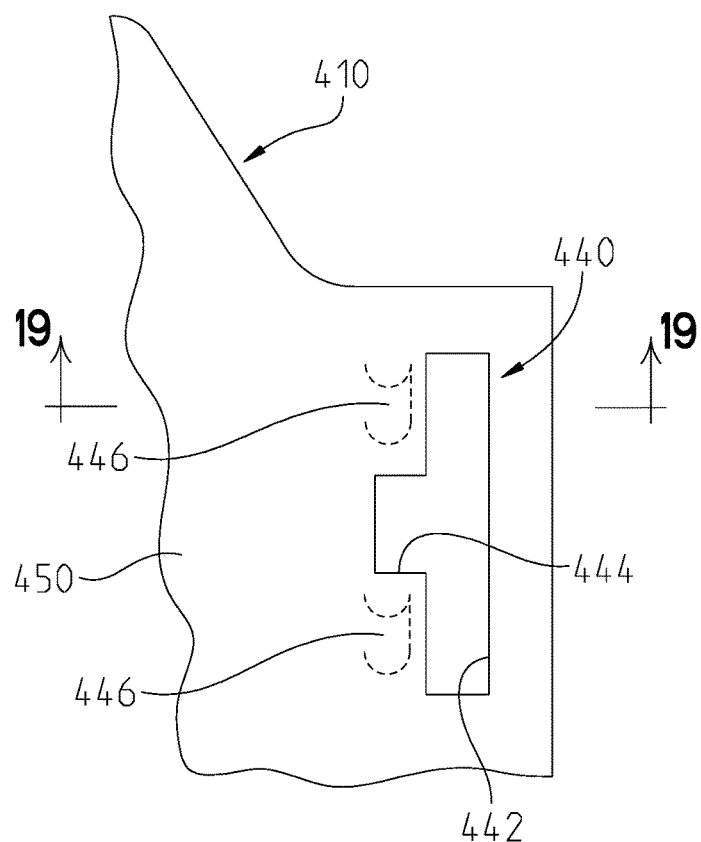
FIG. 18 shows an enlarged view of an integrated locking bracket, integrated into the front fender.
Figure 19:
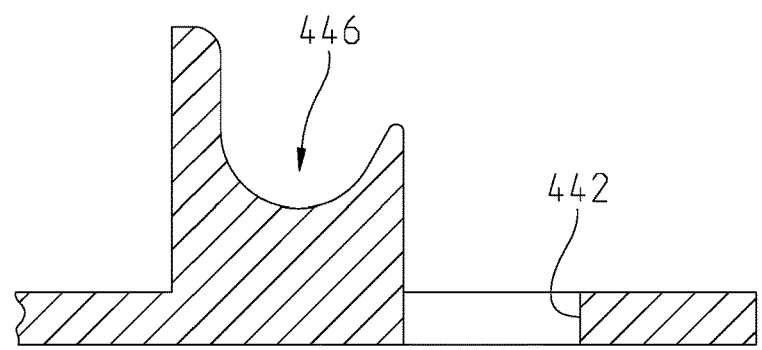
FIG. 19 is a cross sectional view through lines 19-19 of FIG. 18.

Alternatively, the locking bracket could be integrated into the front body portion 10. More particularly, and with reference to FIG. 18, the counterpart locking could be provided by an integrated member 440, integrated into a rear face of the front fender 450. The member 440 would include an entry slot 442, a notch 444 and integrated hook portions 446. This configuration could all be a molded part, molded with the front fender 450. This is best shown in FIG. 19 with integrated hook portions 446 molded into the fender. As the body portions of utility vehicle 2 are typically comprised of a plastic material, this integration would be accomplished at the molding phase.

Figure 20:
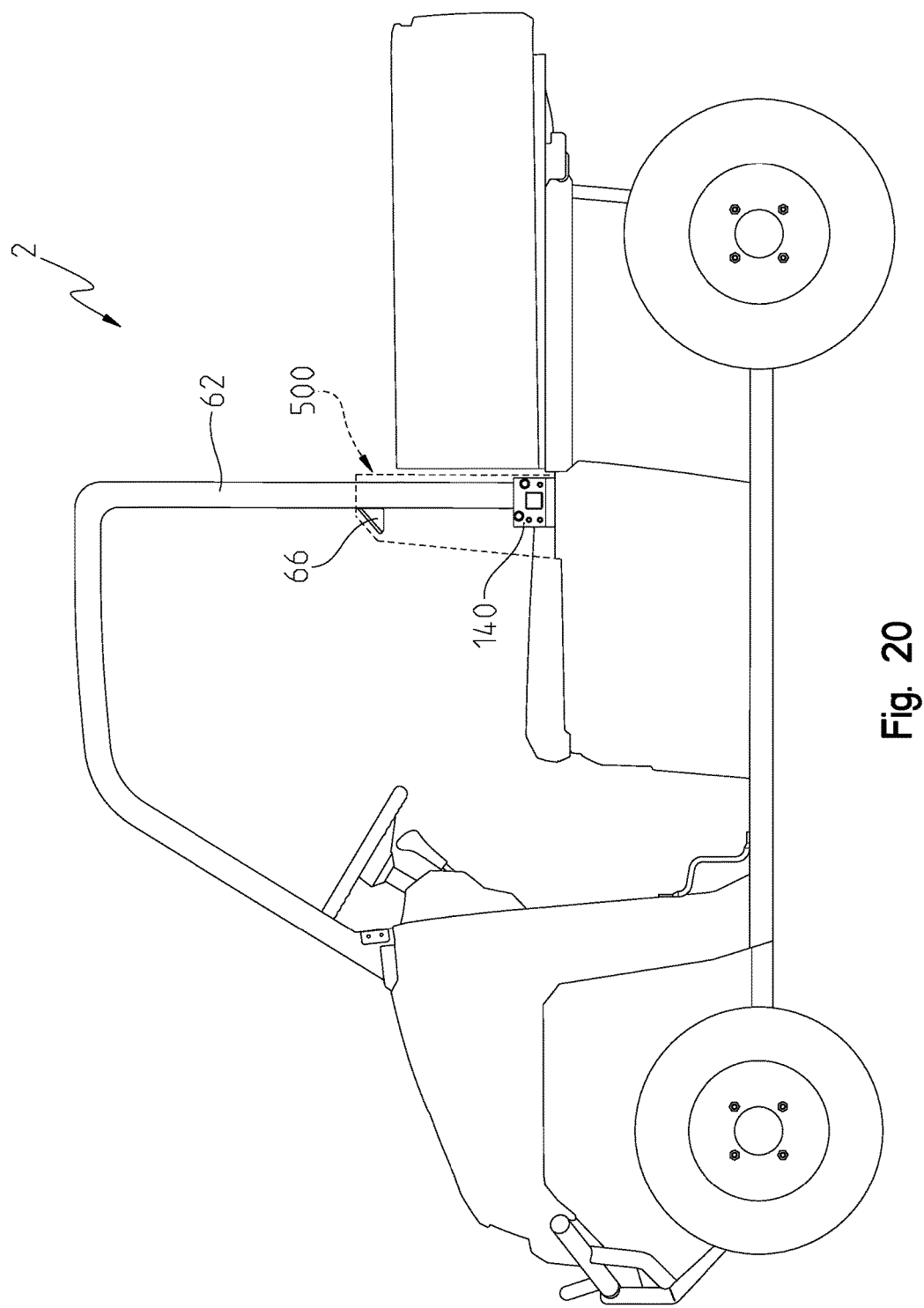
FIG. 20 shows a left side view of an alternate vehicle for use with an alternate side restraint.

With reference to FIGS. 20-24, a further embodiment of side restraint will be described. With reference first to FIG. 20, vehicle 2 is shown having a cover 500 (shown in phantom) which covers a portion of rear post 62, upper bracket 66 and box-shaped bracket portion 140. Vehicle 2 would accommodate the mounting of side restraint 502 (FIG. 22) over cover 500.

Figure 21:
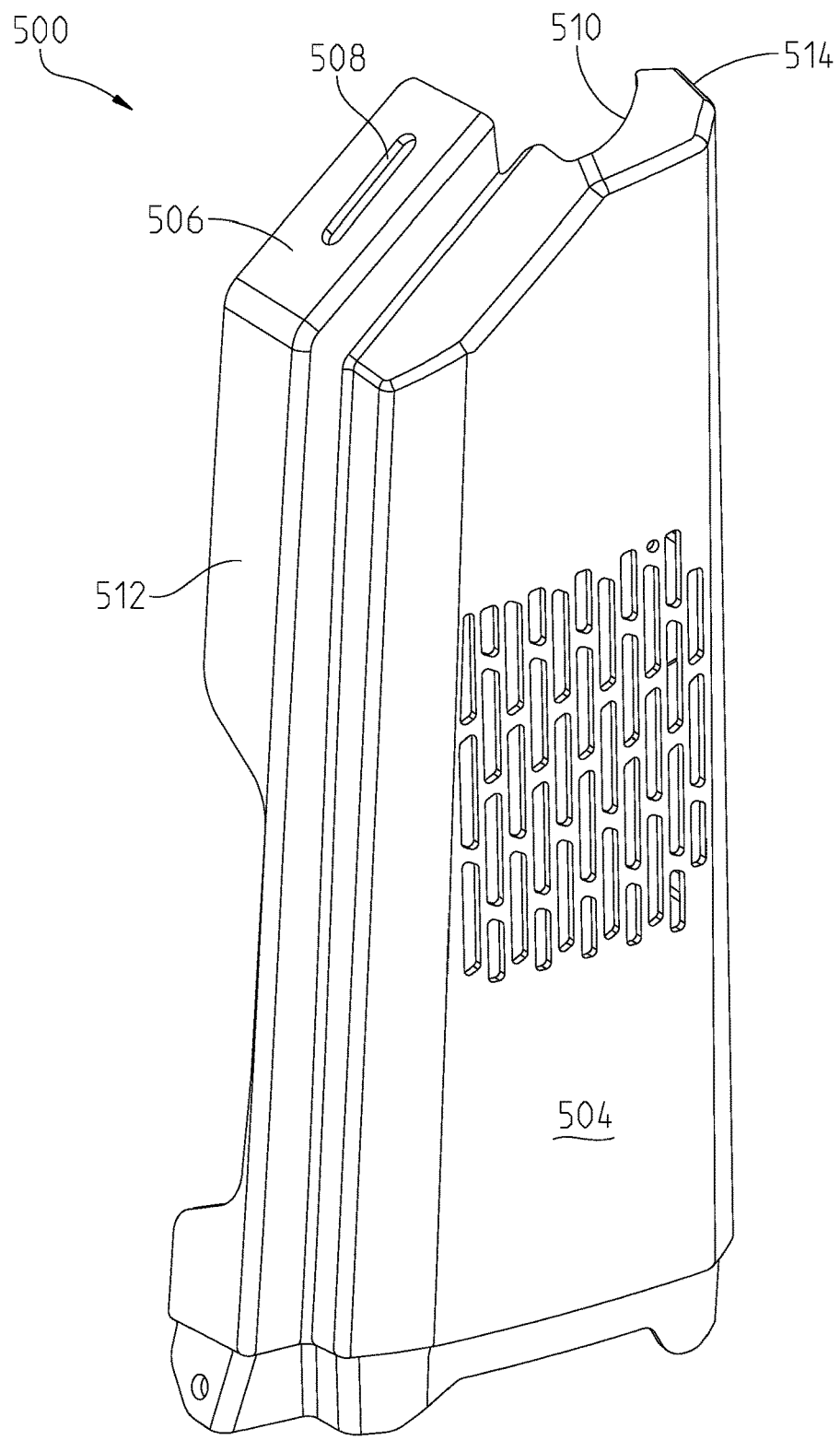
FIG. 21 shows a cover for placement over the rear post of the vehicle as shown in phantom in FIG. 20.

With reference to FIG. 21, cover 500 includes an outer wall 504, an upper angled wall at 506 having a slot at 508 and an arcuate opening 510 which would encompass the rear post 62. Cover 500 also includes a front wall 512 and a rear wall 514. It should be appreciated that slot 508 allows access to threaded apertures 100 (FIG. 5). With reference now to FIGS. 22-25, side restraint 502 will be described in greater detail.

Figure 22:
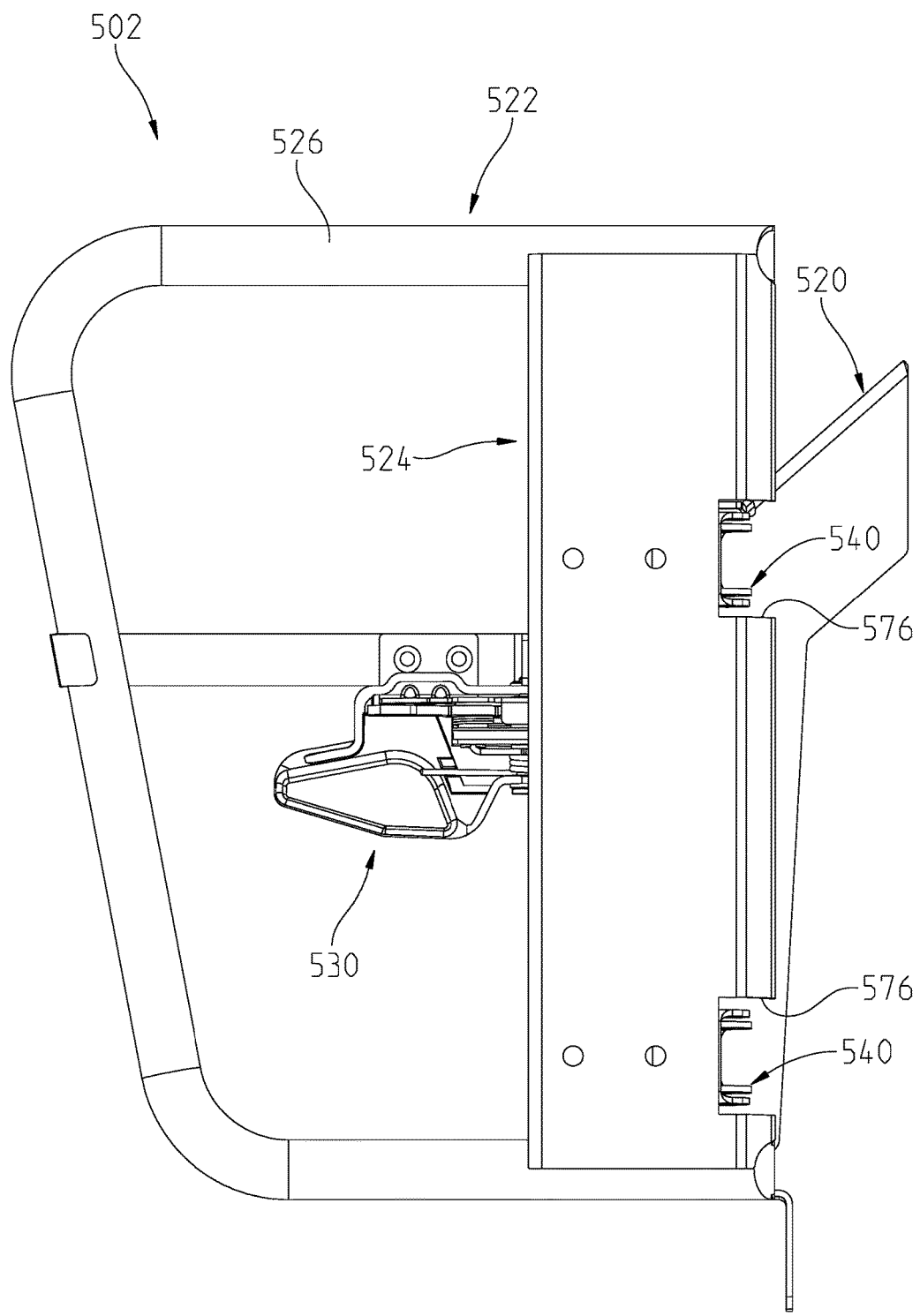
FIG. 22 is an outer side view of the side restraint for use with the vehicle of FIG. 20.
Figure 23:
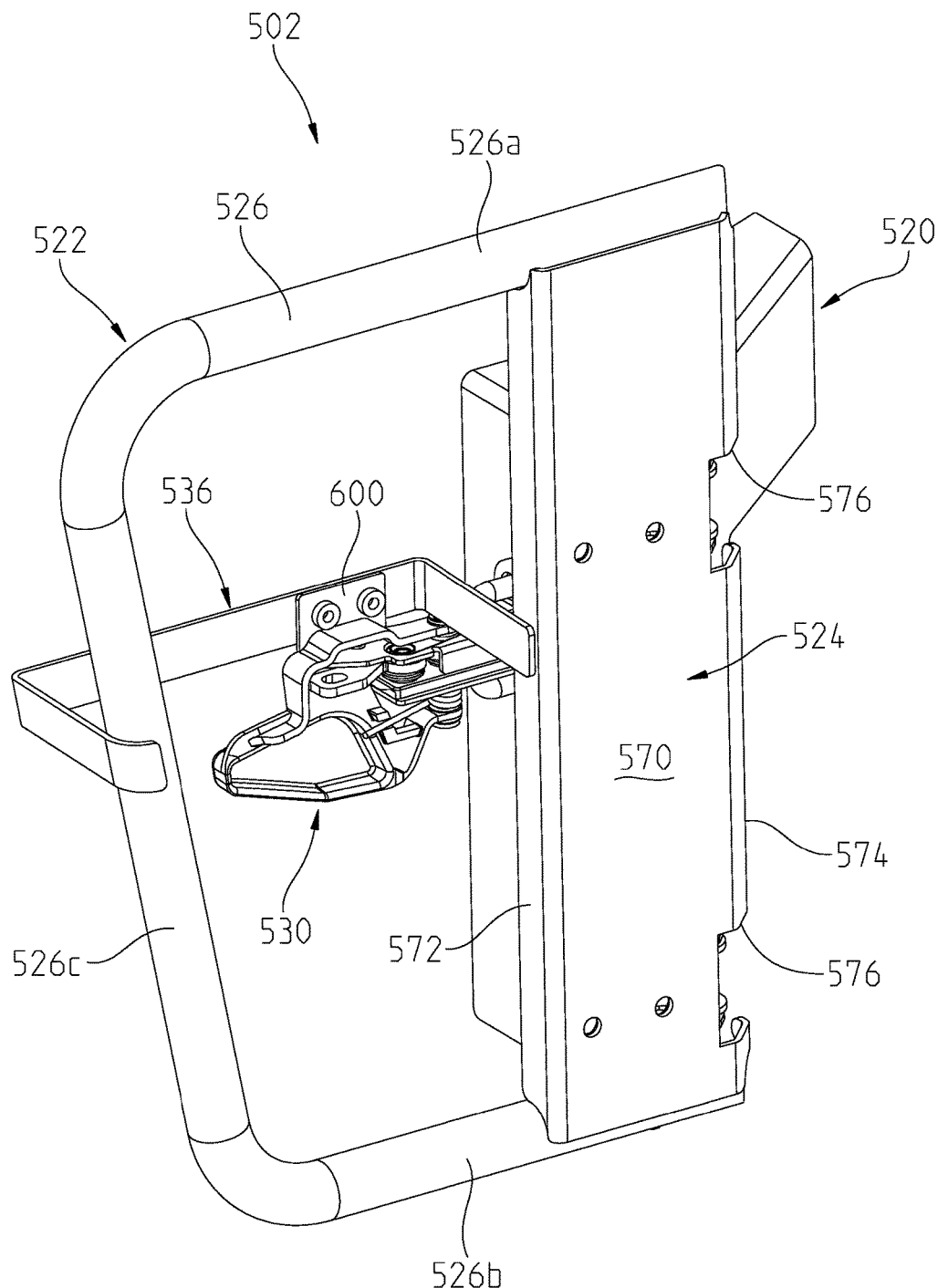
FIG. 23 is a left front perspective view of the side restraint of FIG. 22.
Figure 24:
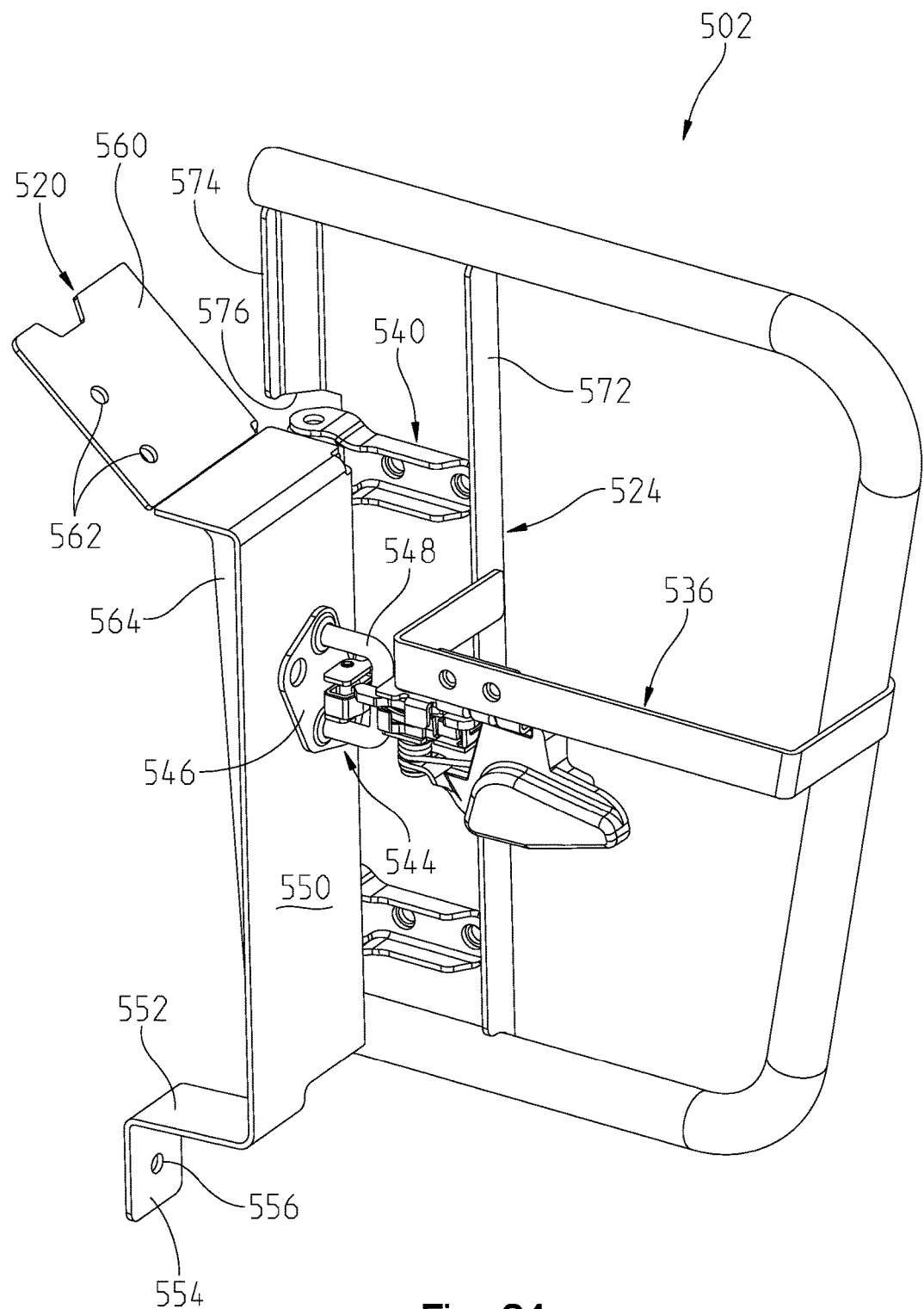
FIG. 24 is right front perspective view of an inside of the side restraint of FIGS. 22 and 23.
Figure 25:
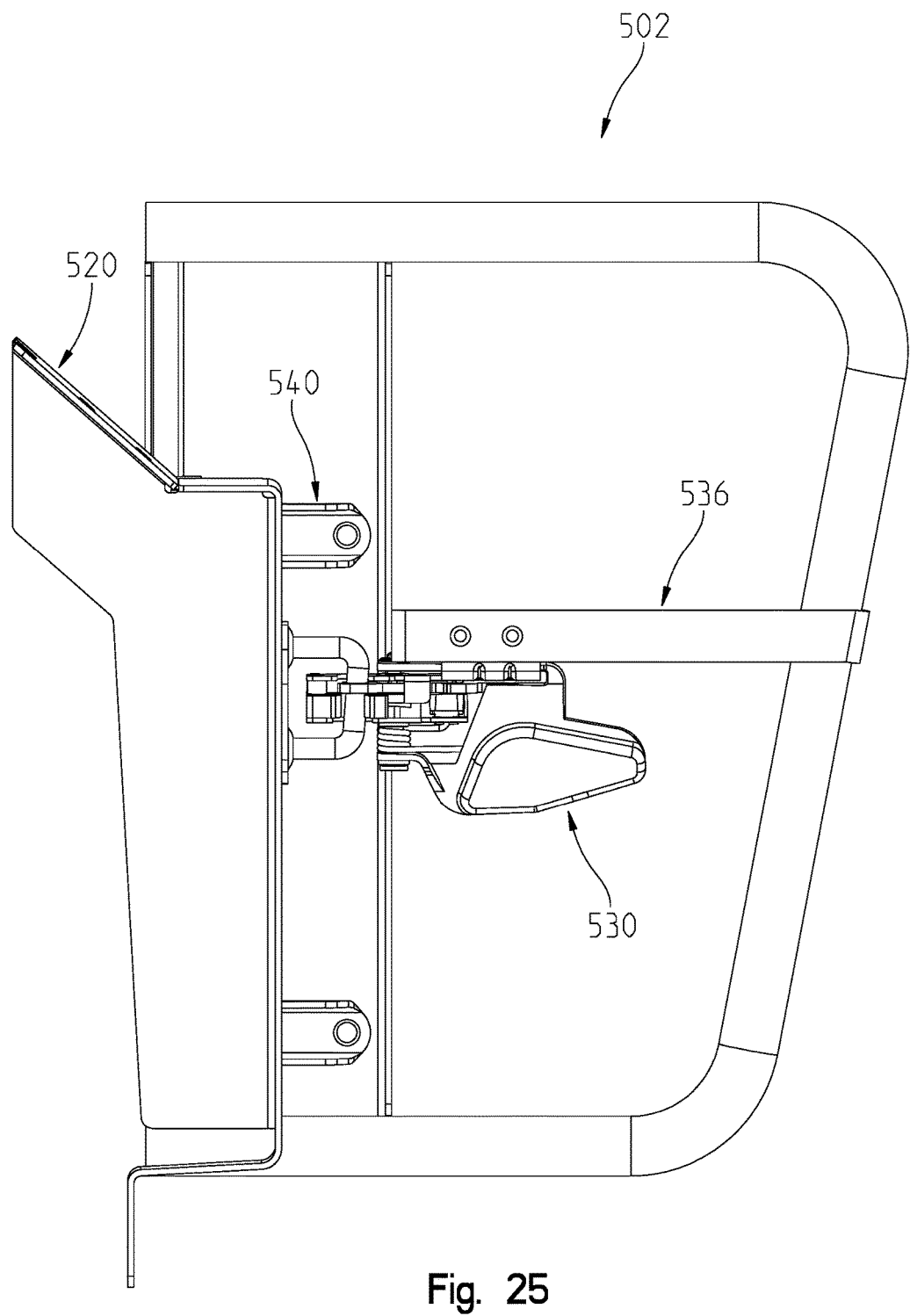
FIG. 25 is a right side plan view from the inside of the vehicle showing the side restraint of FIG. 22.

With reference first to FIGS. 22 and 24, side restraint 502 generally includes a mounting bracket 520, a restraint bar assembly 522 comprised of a vertical support 524, a restraint bar 526, and a latch 530. As shown best in FIG. 23, latch 530 is coupled to assembly 522 by way of a strap portion 536 and restraint bar assembly 522 is coupled to bracket 520 by way of hinges 540 (FIG. 24). Latch assembly 530 includes a striker 544 having a mount portion 546 coupled to bracket 520 and a U-shaped striker bar 548.

As best shown in FIG. 24, bracket 520 includes wall 550 to which striker 544 is mounted, and an L-shaped leg 552 having a leg portion 554 having an aperture at 556. Bracket 520 further includes an angled leg portion at 560 having apertures at 562 and side wall 564. It should be appreciated that bracket 520 can be mounted to upper bracket 66 and lower bracket 140 (FIG. 20) where a fastener could be positioned through aperture 556 and into threaded engagement with threaded aperture 144A (FIG. 5) and fasteners could be positioned through apertures 562 and into threaded engagement with threaded apertures 100 (FIG. 5). It should be appreciated that the fasteners extending through bracket apertures 562 would extend through slot 508 (FIG. 21).

Figure 27:
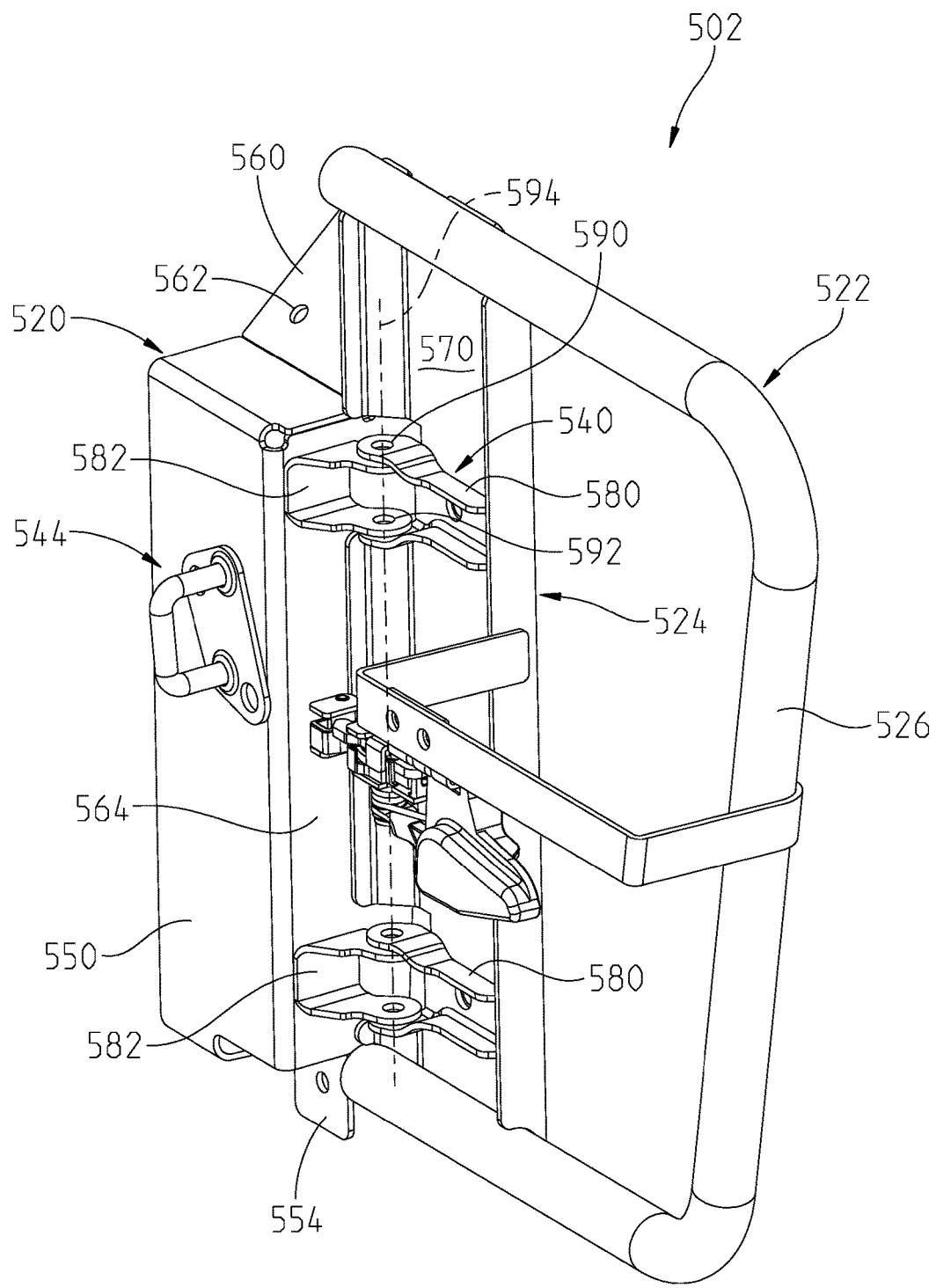
FIG. 27 shows the side restraint in the perspective of FIG. 23 with the side restraint rotated open by 90°.
Figure 28:
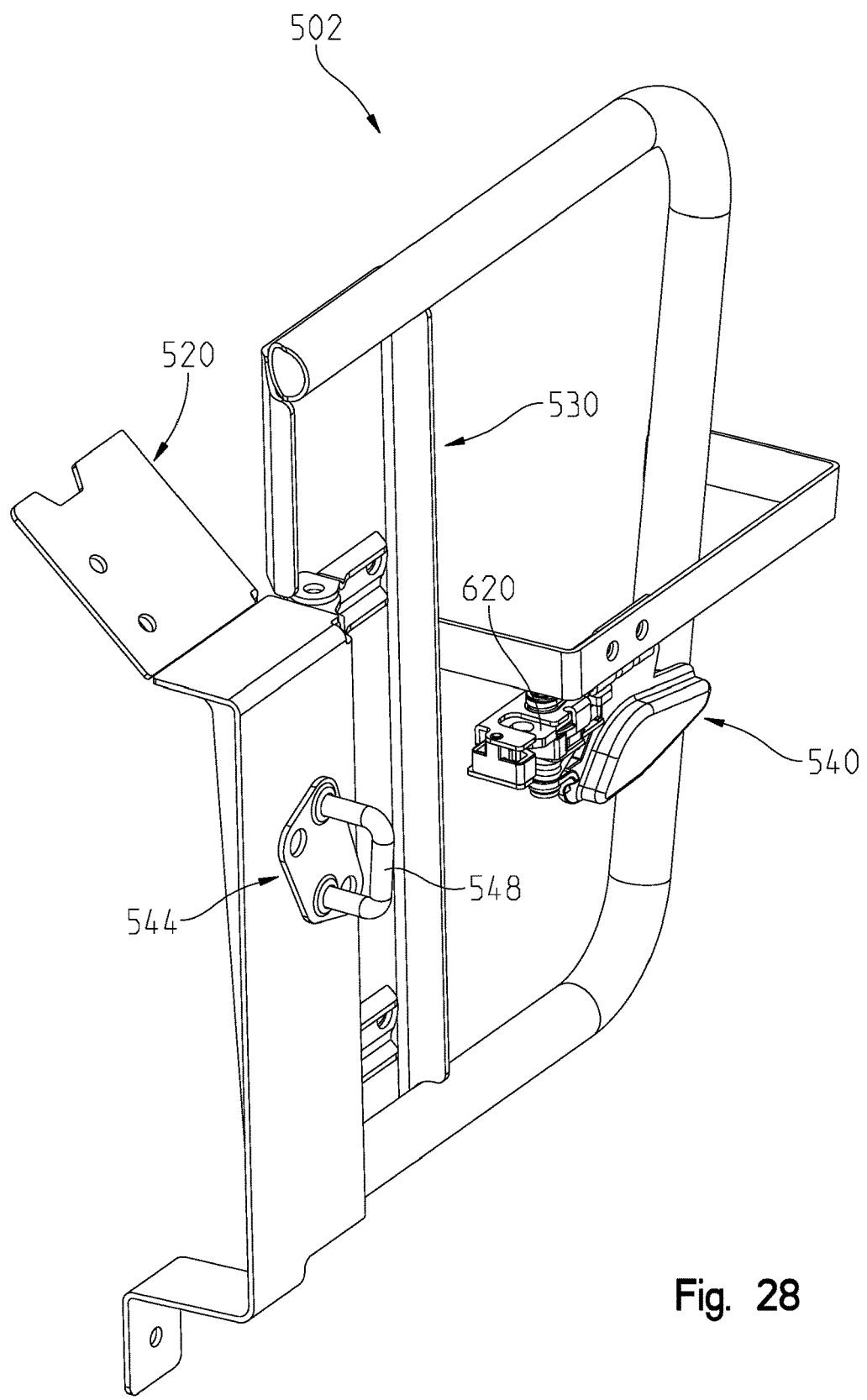
FIG. 28 shows a right front perspective view of the side restraint of FIG. 26.
Figures 29, 30:
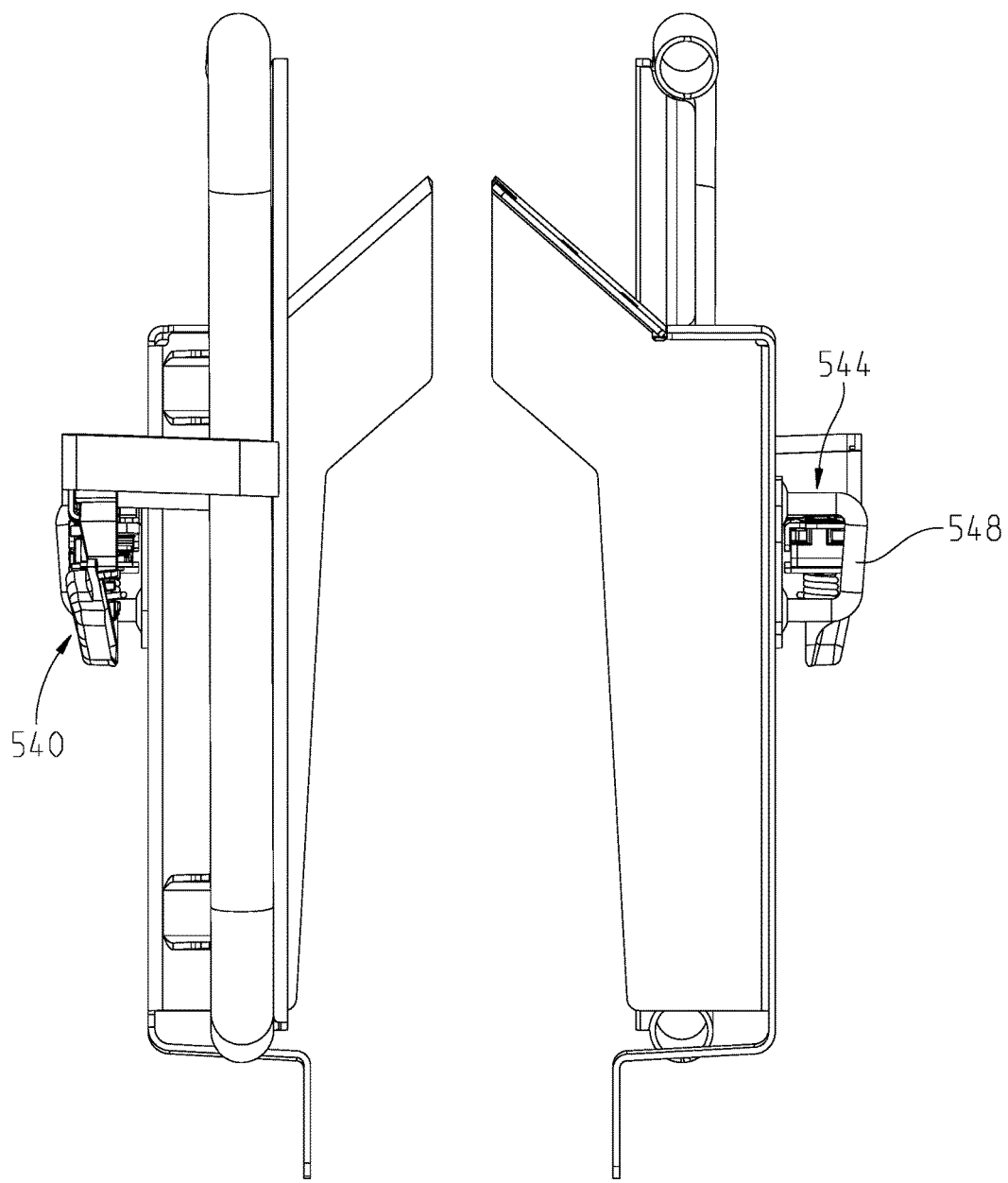
FIG. 29 is a front end view of the side restraint in the open position.
FIG. 30 is a rear end view of the side restraint in the open position.
Figure 31:
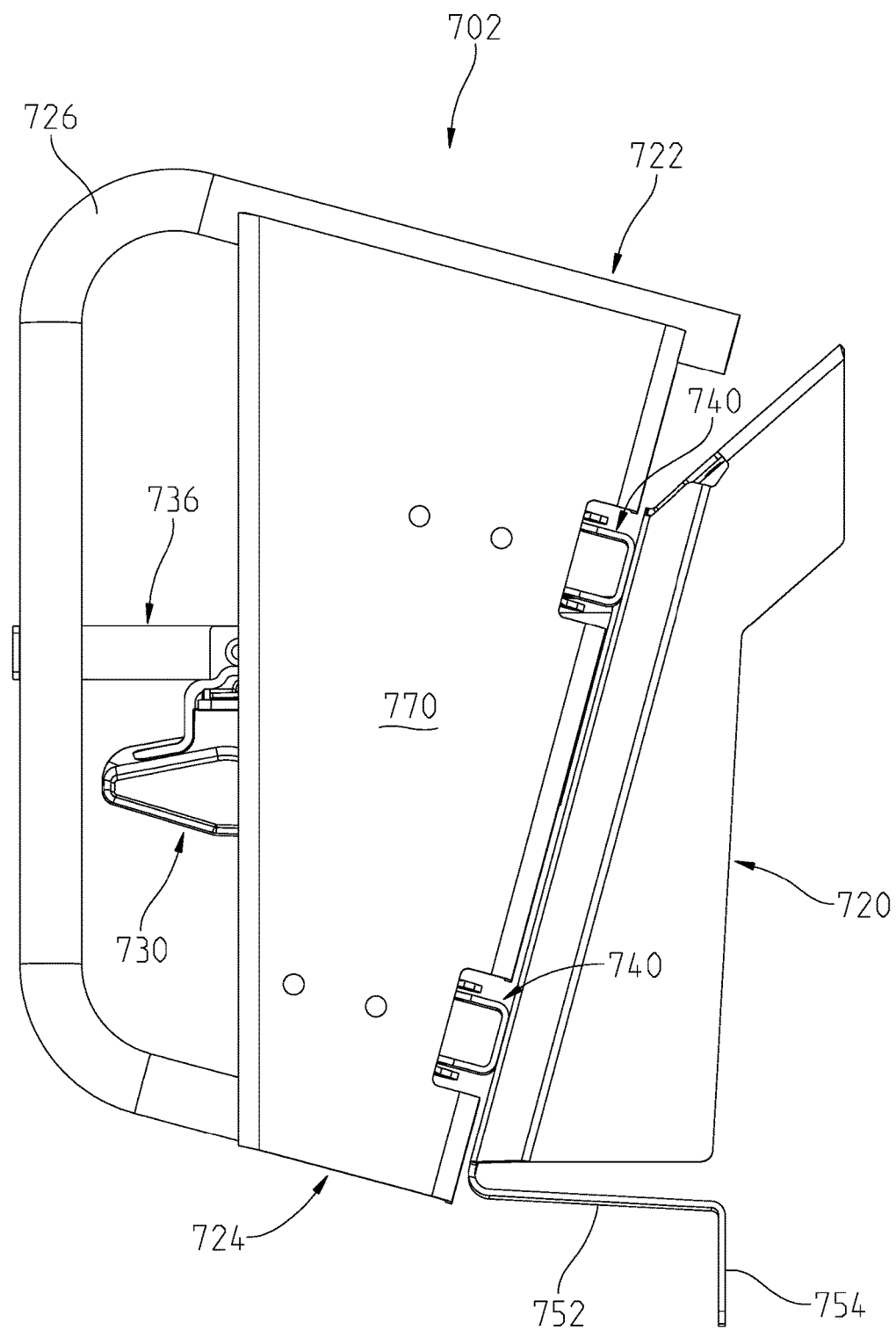
FIG. 31 is an outer side view of another side restraint for use with the vehicle of FIG. 20 and the cover of FIG. 21.

With reference still to FIGS. 22-25, side restraint assembly 522 will now be described in greater detail. Vertical support 524 is shown as including a channel shaped member having a vertical wall 570 and side walls 572 and 574. Side wall 574 is notched at 576 to allow clearance for rotation of the side restraint assembly as described herein. As shown best in FIG. 27, hinges 540 include hinge portion 580 coupled to wall 570 and hinge portion 582 coupled to wall portion 564 of bracket 520. Hinges 540 would also include a pin through aperture 590 and 592 so as to rotate about a vertical axis 594.

As shown in FIG. 23, restraint bar 526 includes an upper bar portion 526a coupled to a top edge of vertical support 524, a lower bar portion 526b coupled to a lower edge of vertical support 524 and a front bar portion 526c. Strap portion 536 is coupled between bar portion 526c and side wall 572 of vertical support 524 to retain latch 530 in position.

Figure 26:
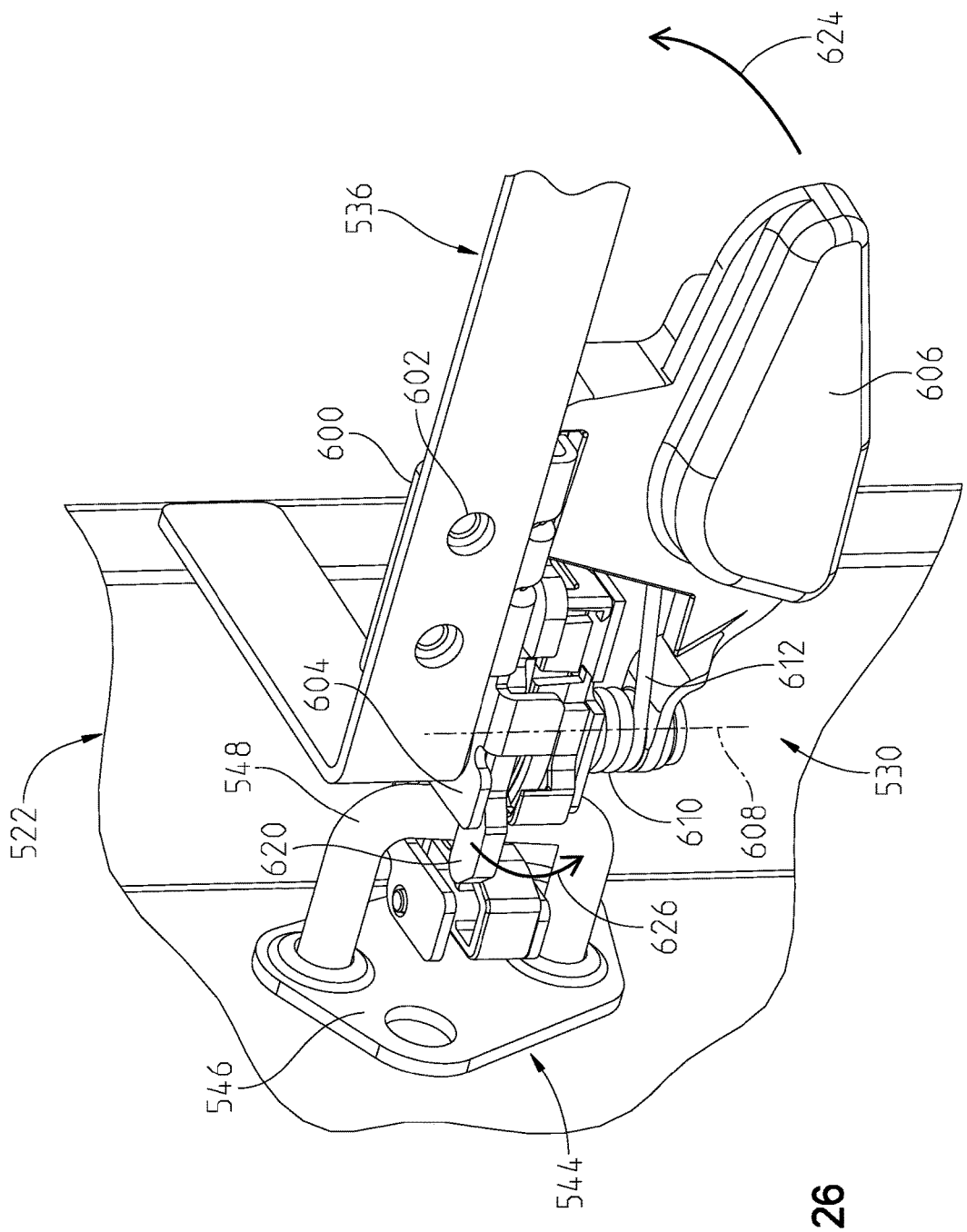
FIG. 26 is an enlarged view of the latch of the side restraint of FIG. 22 in the latched position.

With reference now to FIG. 26, latch 530 will be described in greater detail. As shown, latch 530 includes a mounting tab at 600 which couples to apertures 602 of strap portion 536. Latch 530 includes a base portion 604 which rotatably couples an actuator 606 thereto, where actuator 606 rotates about an axis 608. A torsion spring 610 is coupled around the axis of rotation 608 and includes a spring leg 612 positioned behind actuator 606 such that actuator 606 is spring loaded into the position shown in FIG. 26. Latch 530 further includes a U-shaped latch 620 (only one leg of which is visible in FIG. 26) encompassing striker 548.

Thus, when actuator 606 is moved in the direction of arrow 624, U-shaped latch 620 is released and the door may be swung to an open position whereby U-shaped latch 620 rotates into an open position in the direction of arrow 626, where it remains while in the open position. When the side restraint assembly 522 is then again moved to the closed position, the U-shaped latch 620 hits the striker 548 where upon the U-shaped latch returns to the position shown in FIG. 26, latching the door to a closed position.

The open position of the side restraint 502 is shown in FIGS. 27-30, where the restraint allows ingress/egress to the vehicle 502. It should be appreciated that the side restraint 502 of FIGS. 22-30 encompasses the point R for vehicle 2 as shown in FIG. 20 when closed, and does not encompasses the point R when open.

With reference now to FIGS. 31-38, another embodiment of side restraint will be described. With reference first to FIGS. 31-34, side restraint 702 generally includes a mounting bracket 720, a restraint bar assembly 722 comprised of a vertical support 724, a restraint bar 726, and a latch 730. It should be appreciated that side restraint 702 is mountable to the vehicle 2 as shown in FIG. 20. As shown best in FIG. 34, latch 730 is coupled to assembly 722 by way of a strap portion 736 and restraint bar assembly 722 is coupled to bracket 720 by way of hinges 740. Latch assembly 730 includes a striker 744 (FIG. 36) having a mount portion 746 coupled to bracket 720 and a U-shaped striker bar 748.

Figure 33:
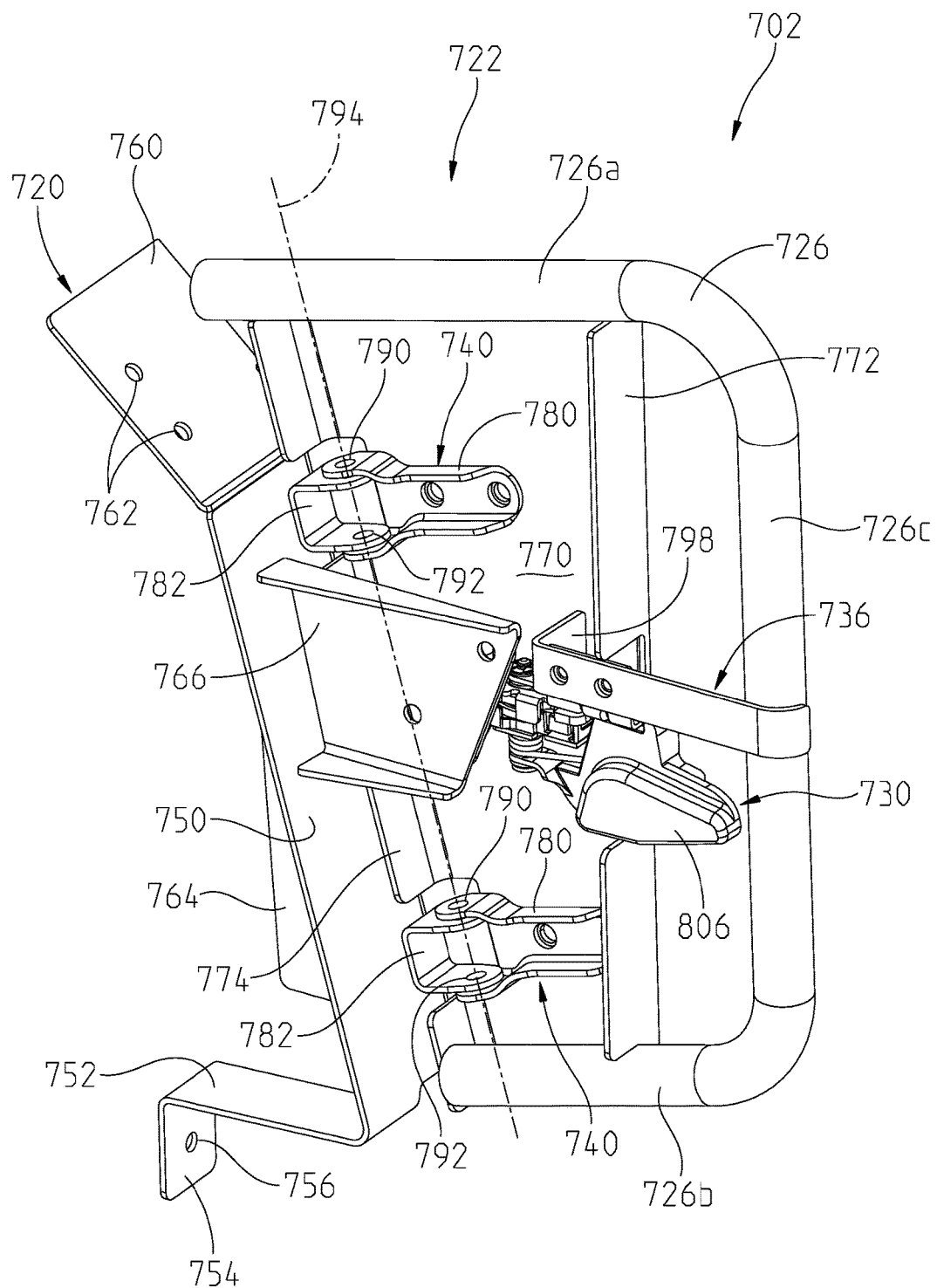
FIG. 33 is right front perspective view of an inside of the side restraint of FIGS. 31 and 32.
Figure 34:
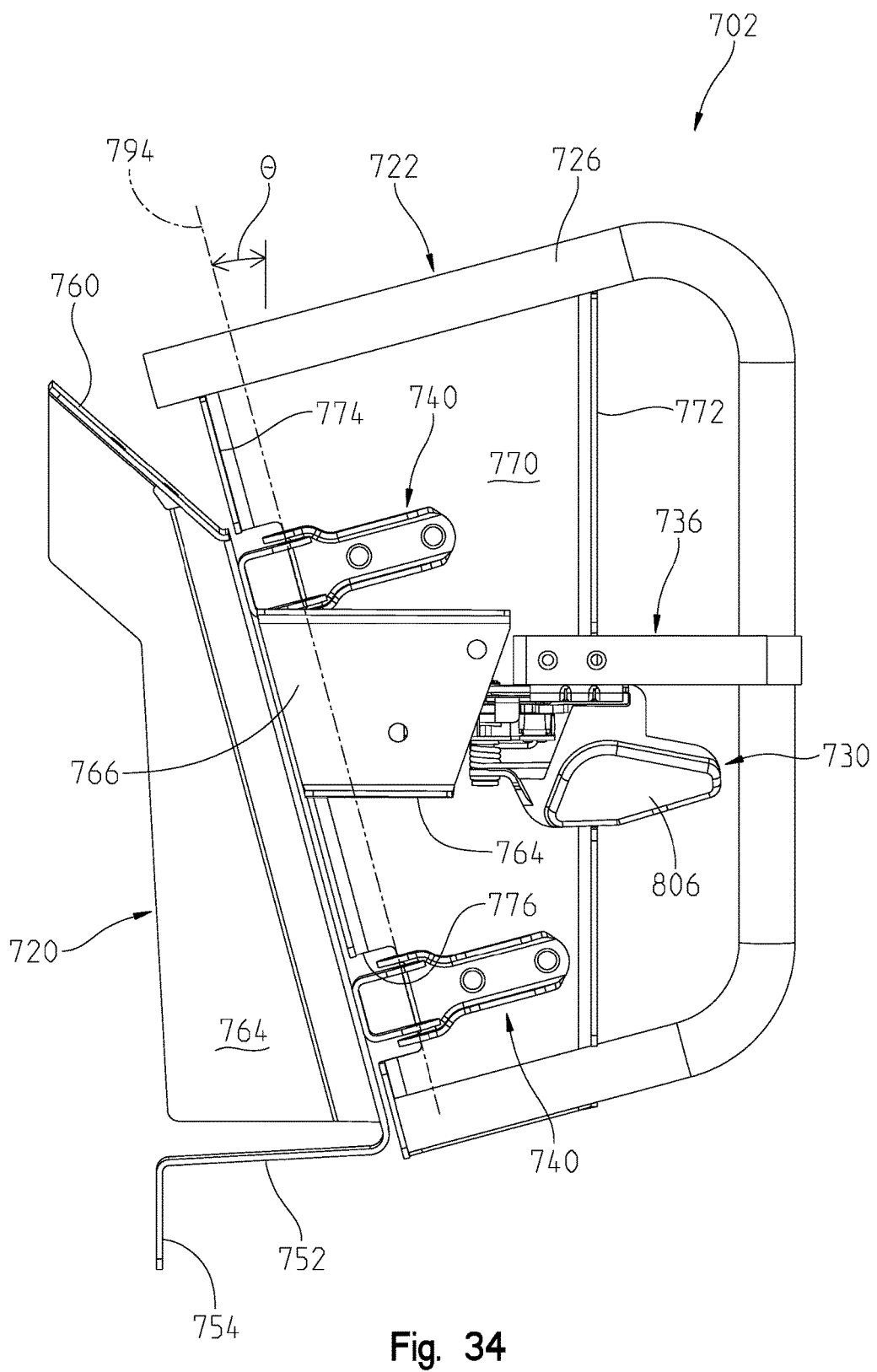
FIG. 34 is a right side plan view from the inside of the vehicle showing the side restraint of FIG. 31.
Figure 35:
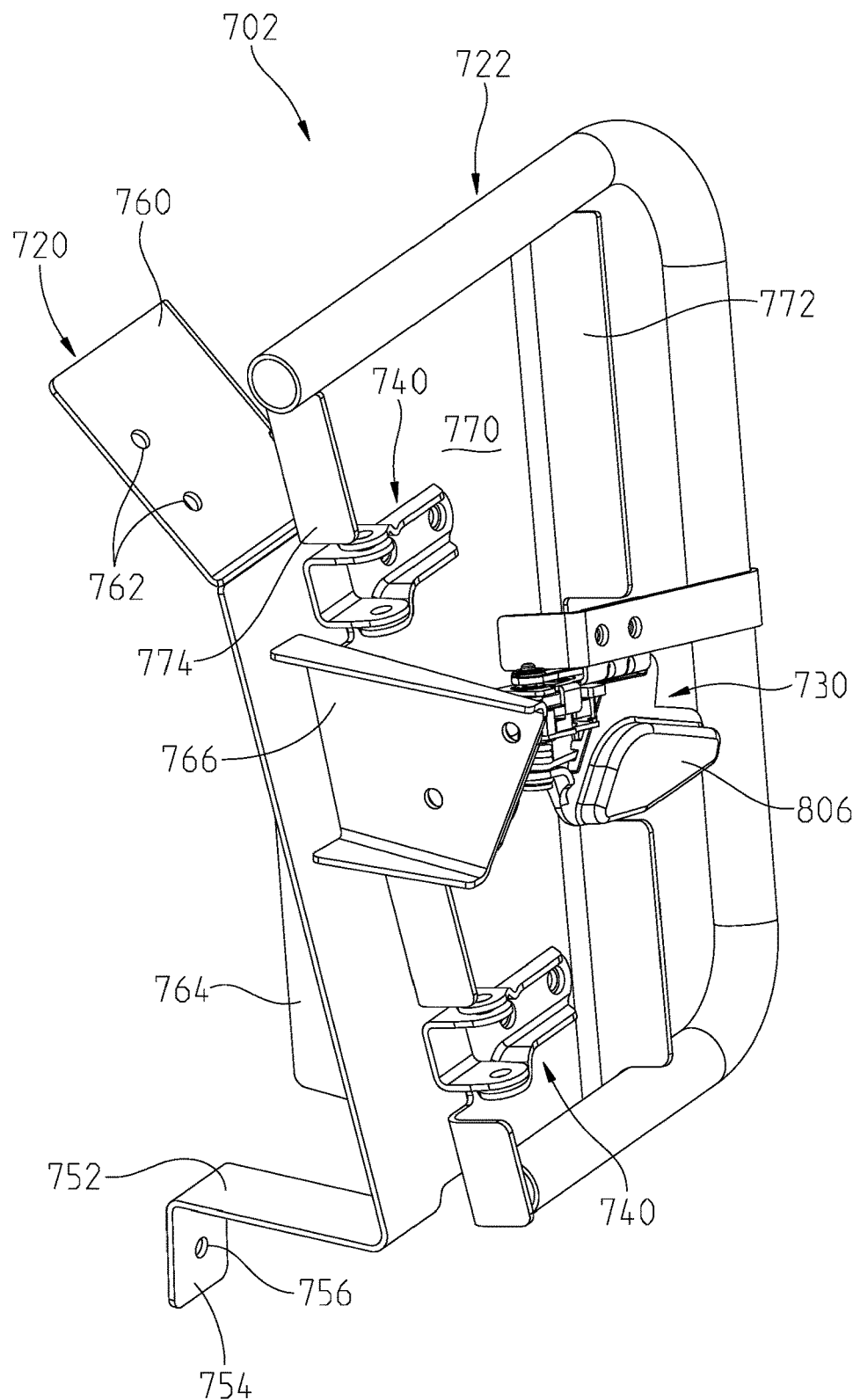
FIG. 35 shows the side restraint in the perspective of FIG. 33 with the side restraint rotated open by 90°.
Figure 36:
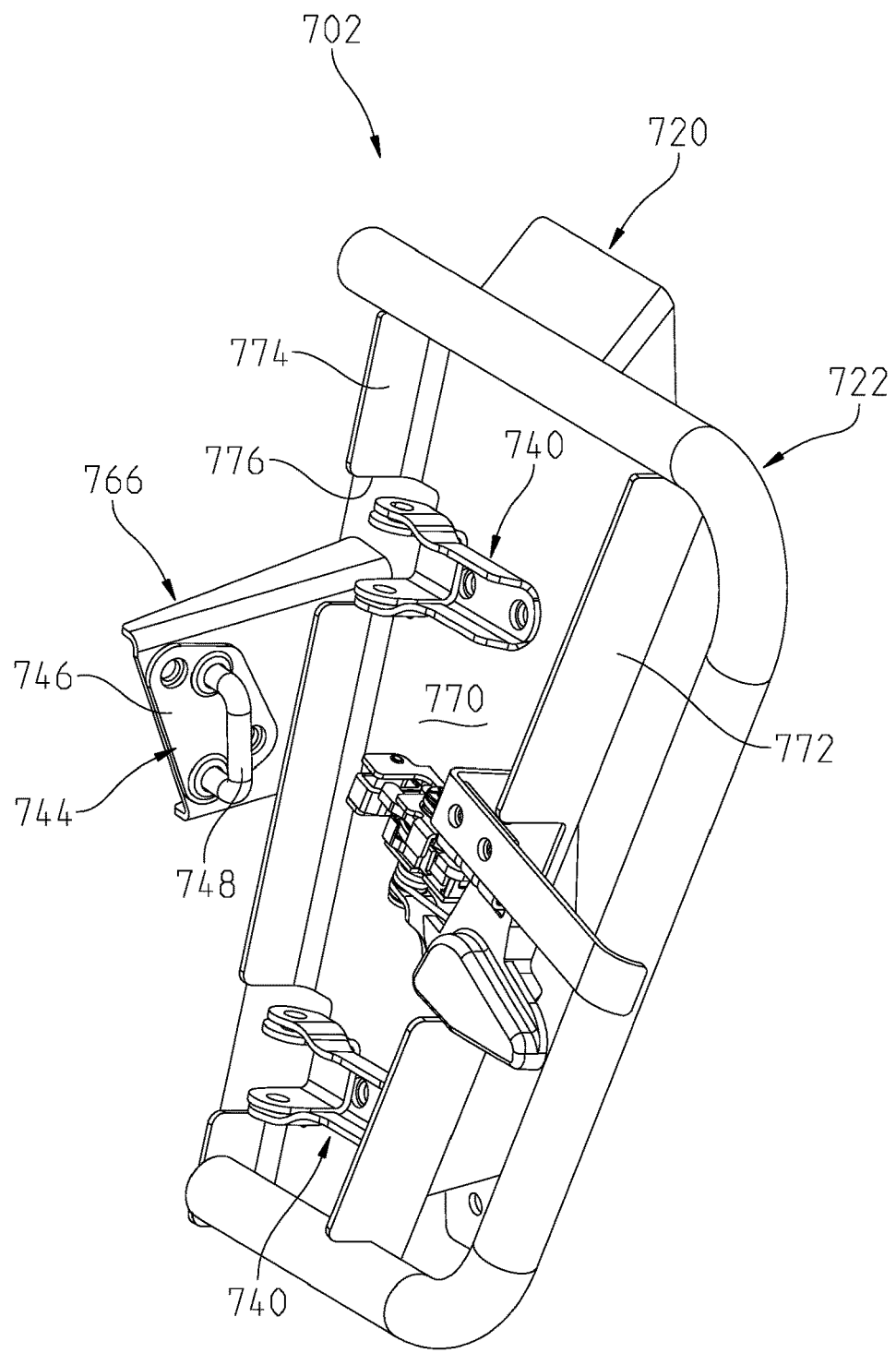
FIG. 36 shows a front left perspective view of the side restraint rotated open by 90°.
Figure 37:
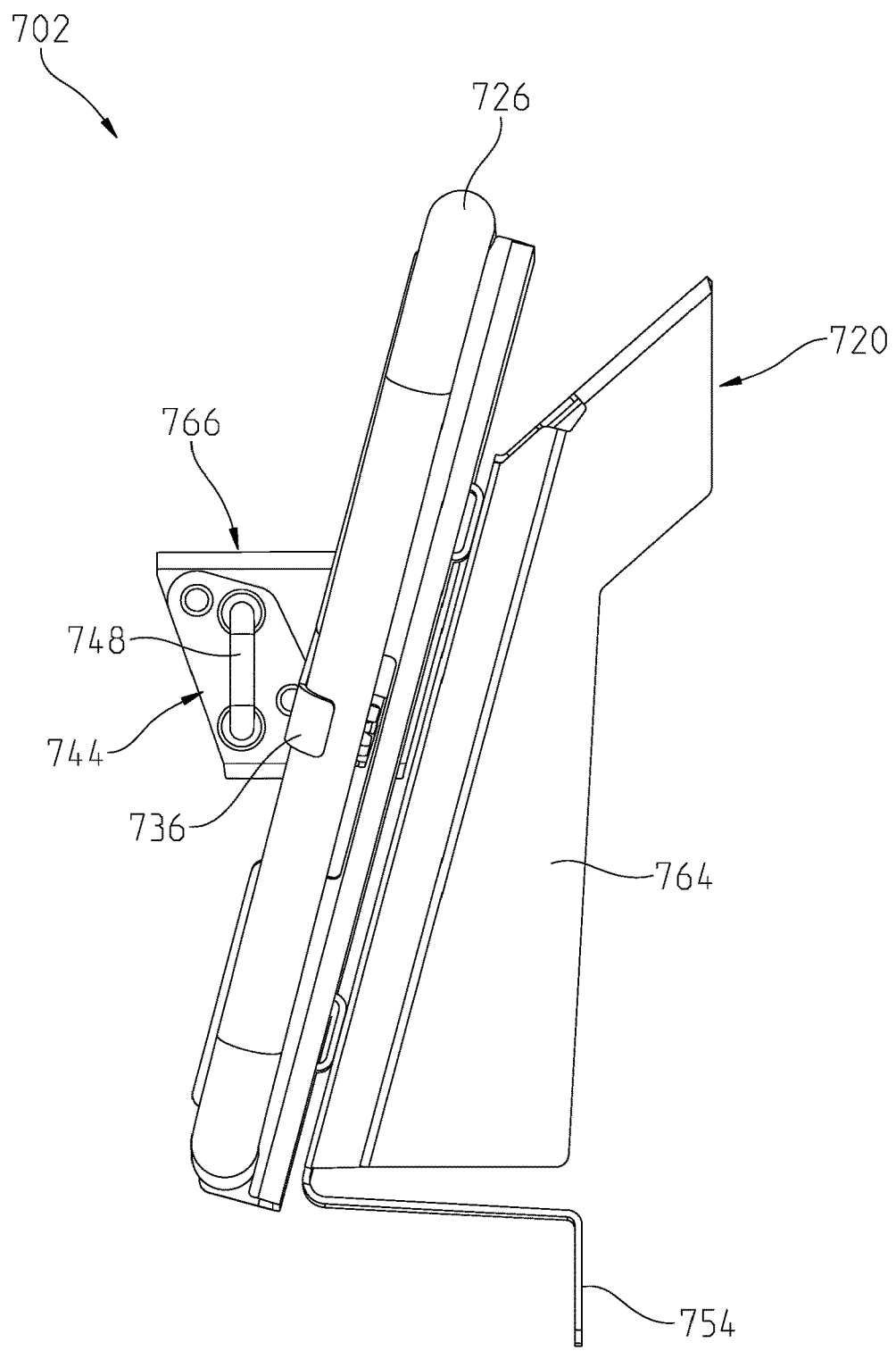
FIG. 37 is a front end view of the side restraint in the open position.
Figure 38:
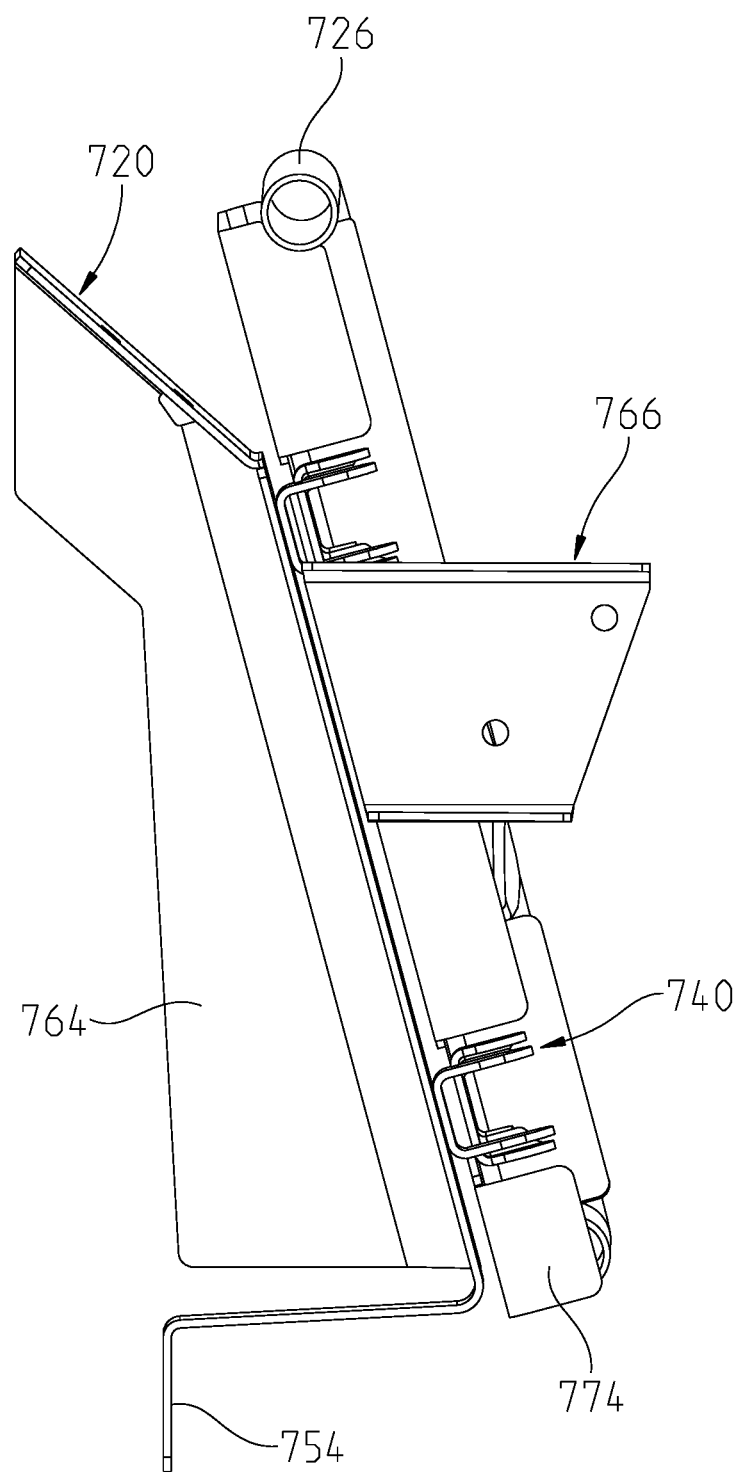
FIG. 38 is a rear end view of the side restraint in the open position.

As best shown in FIG. 33, bracket 720 includes wall 750 and an L-shaped leg 752 having a leg portion 754 having an aperture at 756. Bracket 720 further includes an angled leg portion at 760 having apertures at 762 and side wall 764. Bracket 720 further includes leg 766 to which striker 744 is mounted. It should be appreciated that bracket 720 can be mounted to upper bracket 66 and lower bracket 140 (FIG. 20) where a fastener could be positioned through aperture 756 and into threaded engagement with threaded aperture 144a (FIG. 5) and fasteners could be positioned through apertures 762 and into threaded engagement with threaded apertures 100 (FIG. 5). It should be appreciated that the fasteners extending through bracket apertures 762 would extend through slot 508 of cover 500 (FIG. 21).

Figure 32:
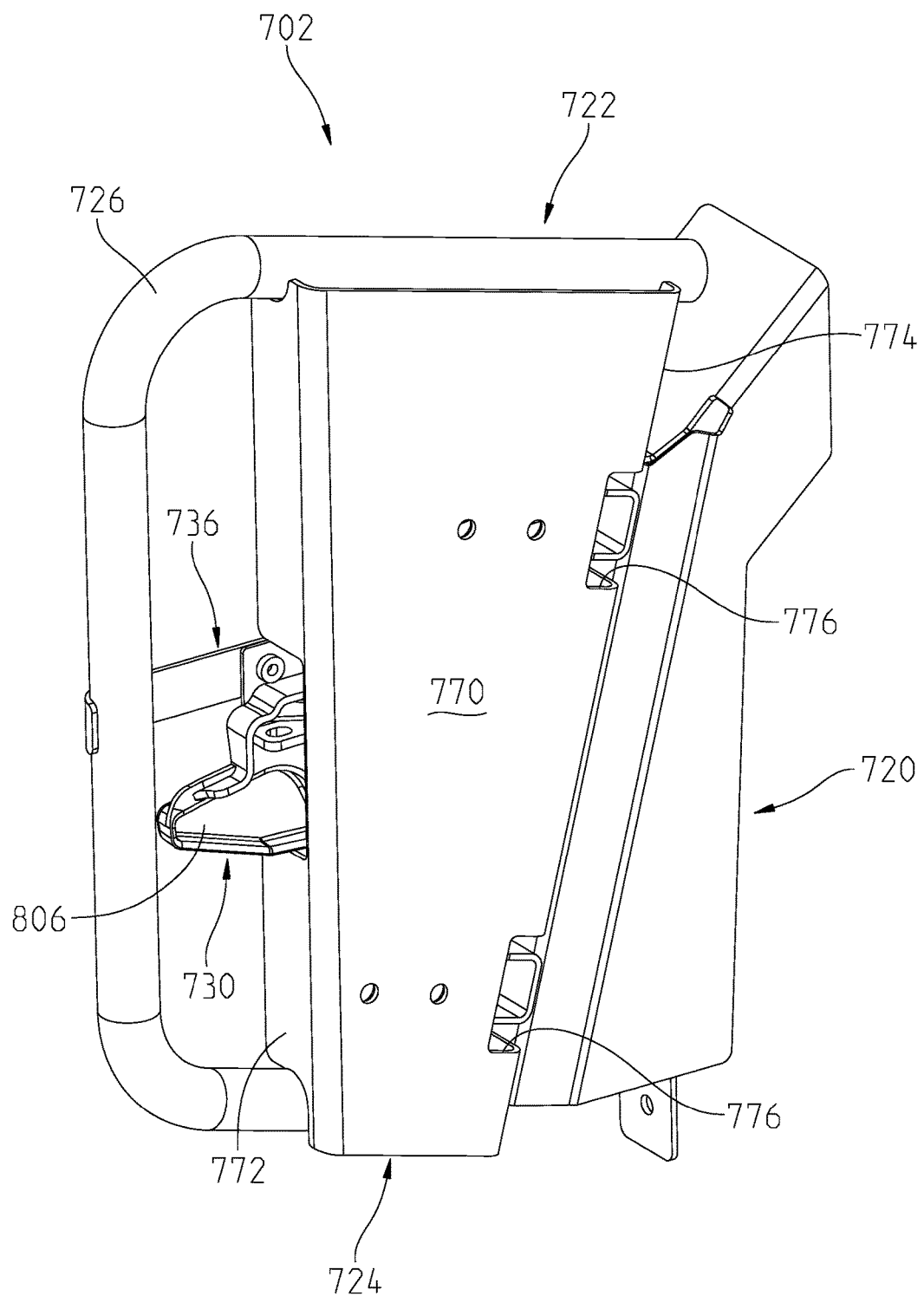
FIG. 32 is a left front perspective view of the side restraint of FIG. 31.

With reference now to FIG. 32, side restraint assembly 722 will now be described in greater detail. Vertical support 724 is shown as including a channel shaped member having a vertical wall 770 and side walls 772 and 774. Side wall 774 is notched at 776 to allow clearance for rotation of the side restraint assembly as described herein. As shown best in FIG. 33, hinges 740 include hinge portion 780 coupled to wall 770 and hinge portion 782 coupled to wall portion 750 of bracket 720. Hinges 740 would also include a pin through aperture 790 and 792 so as to rotate about an axis 794 offset from vertical. In the embodiment shown, side restraint 702 rotates about axis 794 where an angle θ (see FIG. 34) between axis 794 and a vertical axis is 15°. The axis could be in a range of 5°-30°, but preferably in the range of 10°-20°.

As shown in FIG. 33, restraint bar 726 includes an upper bar portion 726a coupled to a top edge of vertical support 724, a lower bar portion 726b coupled to a lower edge of vertical support 724 and a front bar portion 726c. Strap portion 736 is coupled between bar portion 726c and wall 770 of vertical support 724 to retain latch 730 in position. Strap portion 736 is coupled to wall 770 at edge 798. Latch 730 is the same as latch 530 and therefore will not be described again here. Suffice it to say that latch 730 includes an actuator 806 which couples and decouples the side restraint assembly 722 to striker 744 in the same manner as described above with reference to FIG. 26.

The open position of the side restraint 702 is shown in FIGS. 35-38, where the restraint 722 allows ingress/egress to the vehicle 2. It should be appreciated that the side restraint 702 of FIGS. 31-38 encompasses the point R for vehicle 2 as shown in FIG. 20 when closed, and does not encompass the point R when open.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle comprising:
   at least one seat having a seat bottom to support the weight of an occupant, and a seatback to support the occupant's back, the seat bottom having a forwardmost position;
   the vehicle having a point R defined by the seatback wherein Point R is located 432 mm (17 inches) along the seat back above an intersection of the seat back and the seat bottom and 152 mm (6 inches) forward of and perpendicular to the seatback surface without an occupant's weight on the seat; and
   a side restraint adjacent to the seatback having a first position encompassing Point R when viewed from the side of the vehicle, and a second position to assist ingress and egress of the occupant when the vehicle is not moving, the side restraint having a forwardmost position that is rearward of the seat bottom forwardmost position;
   wherein the side restraint rotates downwardly along a generally horizontal rotational axis and wherein the side restraint defines a link arm of a linkage.

2. The utility vehicle of claim 1, wherein the side restraint does not encompass point R when in the second position.

3. The utility vehicle of claim 1, wherein the side restraint swings outwardly along a generally vertical swing axis.

4. The utility vehicle of claim 1, further comprising a latch to hold the side restraint in the first position.

5. The utility vehicle of claim 4, wherein the latch comprises detents to receive the side restraint.

6. The utility vehicle of claim 5, wherein the side restraint is spring loaded into the detents.

7. The utility vehicle of claim 1, wherein the latch comprises a latch having a latch catch and a striker.

8. The utility vehicle of claim 1, wherein the side restraint swings outwardly along a swing axis that is angled relative to vertical.

9. The utility vehicle of claim 8, wherein the swing axis is at an angle in the range of 5°-30° from vertical.

10. The utility vehicle of claim 1, wherein the first position is generally parallel to a longitudinal axis of the vehicle and second position is generally vertical to the longitudinal axis of the vehicle.

11. The utility vehicle of claim 1, wherein the linkage is a 4-bar linkage.

12. The utility vehicle of claim 11, wherein the linkage includes a lockable link arm that locks into a detented position to hold the side restraint in the first position.

13. A utility vehicle comprising:
    at least one seat having a seat bottom to support the weight of an occupant, and a seatback to support the occupant's back, the seat bottom having a forwardmost position;
    the vehicle having a point R defined by the seatback wherein Point R is located 432 mm (17 inches) along the seat back above an intersection of the seat back and the seat bottom and 152 mm (6 inches) forward of and perpendicular to the seatback surface without an occupant's weight on the seat; and
    a side restraint adjacent to the seatback being movable between first and second positions, where in the first position the side restraint encompasses Point R when viewed from the side of the vehicle, and in the second position the side restraint moves to a position not encompassing Point R, the side restraint having a forwardmost position that is rearward of a forwardmost position of the seat bottom, the side restraint further comprising a retaining mechanism to hold the side restraint in the first position while the vehicle is moving under normal operating conditions.

14. The utility vehicle of claim 13, wherein the side restraint swings outwardly along a generally vertical swing axis.

15. The utility vehicle of claim 13, wherein the retaining mechanism comprises a latch to hold the side restraint in the first position.

16. The utility vehicle of claim 15, wherein the latch comprises detents to receive the side restraint.

17. The utility vehicle of claim 16, wherein the side restraint is spring loaded into the detents.

18. The utility vehicle of claim 13, wherein the side restraint swings outwardly along a swing axis that is angled relative to vertical.

19. The utility vehicle of claim 18, wherein the swing axis is at an angle in the range of 5°-30° from vertical.

20. The utility vehicle of claim 13, wherein the side restraint rotates downwardly along a generally horizontal rotational axis.

21. The utility vehicle of claim 20, wherein the side restraint defines a link arm of a linkage.

22. The utility vehicle of claim 21, wherein the linkage is a 4-bar linkage.

23. The utility vehicle of claim 22, wherein the linkage includes a lockable lever arm that locks into a detented position to hold the side restraint in the first position.

* * * * *